United States Patent
Sonoura et al.

(10) Patent No.: US 11,320,822 B2
(45) Date of Patent: May 3, 2022

(54) UNMANNED TRANSPORT VEHICLE, METHOD OF CONTROLLING UNMANNED TRANSPORT VEHICLE, AND STORAGE MEDIUM

(71) Applicant: Kabushiki Kaisha Toshiba, Minato-ku (JP)

(72) Inventors: Takafumi Sonoura, Yokohama (JP); Daisuke Yamamoto, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 342 days.

(21) Appl. No.: 16/554,724

(22) Filed: Aug. 29, 2019

(65) Prior Publication Data
US 2020/0150664 A1 May 14, 2020

(30) Foreign Application Priority Data

Nov. 9, 2018 (JP) .............................. JP2018-211284

(51) Int. Cl.
*G05D 1/02* (2020.01)
*G06K 7/10* (2006.01)
(Continued)

(52) U.S. Cl.
CPC ......... *G05D 1/0212* (2013.01); *G05D 1/0246* (2013.01); *G06K 7/10366* (2013.01);
(Continued)

(58) Field of Classification Search
None
See application file for complete search history.

(56) References Cited

U.S. PATENT DOCUMENTS

| 6,453,212 B1 | 9/2002 | Asama et al. |
| 2006/0210382 A1* | 9/2006 | Mountz .................. G05D 1/021 414/498 |

(Continued)

FOREIGN PATENT DOCUMENTS

| JP | 2001-255939 A | 9/2001 |
| JP | 2009-286570 A | 12/2009 |

(Continued)

*Primary Examiner* — Jonathan M Dager
*Assistant Examiner* — Garrett F Evans
(74) *Attorney, Agent, or Firm* — Oblon, McClelland, Maier & Neustadt, L.L.P.

(57) ABSTRACT

An unmanned transport vehicle according to an embodiment includes a vehicle body, a moving mechanism, and an operation control device. The vehicle body is combinable with a transport object. The moving mechanism causes the vehicle body to be moved. The operation control device controls an operation of the moving mechanism. The operation control device includes a pseudo-reference position setter, a path acquirer, an operation command generator, and a driving controller. The pseudo-reference position setter sets a pseudo-reference position serving as an operation reference position of a combination structure of the vehicle body and the transport object to be different from a vehicle body reference position that is an operation reference position of the vehicle body. The path acquirer acquires a movement path from a current position of the combination structure to a target position. The operation command generator determines an operation of the combination structure that moves along the movement path acquired by the path acquirer based on the pseudo-reference position and generates an operation command related to a vehicle body operation that implements the determined operation of the combination structure. The driving controller causes the moving mechanism to be driven based on the operation command.

25 Claims, 13 Drawing Sheets

(51) Int. Cl.
*G06V 10/75* (2022.01)
*G06V 20/58* (2022.01)

(52) U.S. Cl.
CPC ............ *G06V 10/751* (2022.01); *G06V 20/58* (2022.01); *G05D 2201/0216* (2013.01)

(56) References Cited

U.S. PATENT DOCUMENTS

| | | |
|---|---|---|
| 2010/0300837 A1 | 12/2010 | Kosuge et al. |
| 2017/0083020 A1* | 3/2017 | Purwin ................ G05D 1/0891 |
| 2017/0291315 A1* | 10/2017 | Wise ...................... B25J 9/1674 |
| 2019/0202388 A1 | 7/2019 | Sonoura et al. |

FOREIGN PATENT DOCUMENTS

| | | |
|---|---|---|
| JP | 2012-122250 A | 6/2012 |
| JP | 5624445 B2 | 11/2014 |
| JP | 2019-119343 A | 7/2019 |

\* cited by examiner

UNMANNED TRANSPORT VEHICLE, METHOD OF CONTROLLING UNMANNED TRANSPORT VEHICLE, AND STORAGE MEDIUM

CROSS-REFERENCE TO RELATED APPLICATION

This application is based upon and claims the benefit of priority from Japanese Patent Application No. 2018-211284, filed Nov. 9, 2018; the entire contents of which are incorporated herein by reference.

FIELD

Embodiments described herein relate generally to an unmanned transport vehicle, a method of controlling the unmanned transport vehicle, and a storage medium.

BACKGROUND

In the logistics field, there is a need for saving labor due to labor shortage and cost reduction. For example, a method of transporting a transport object by an unmanned transport vehicle has been proposed as one of methods of automating the transport of a transport object such as a cage cart. A guideless unmanned transport vehicle having an own position estimation function has been disclosed as an unmanned transport vehicle. Such an unmanned transport vehicle is expected to improve the efficiency of a transport movement operation by avoiding contact with an obstacle or the like when a cage cart is moved.

DETAILED DESCRIPTION

Figure 1:
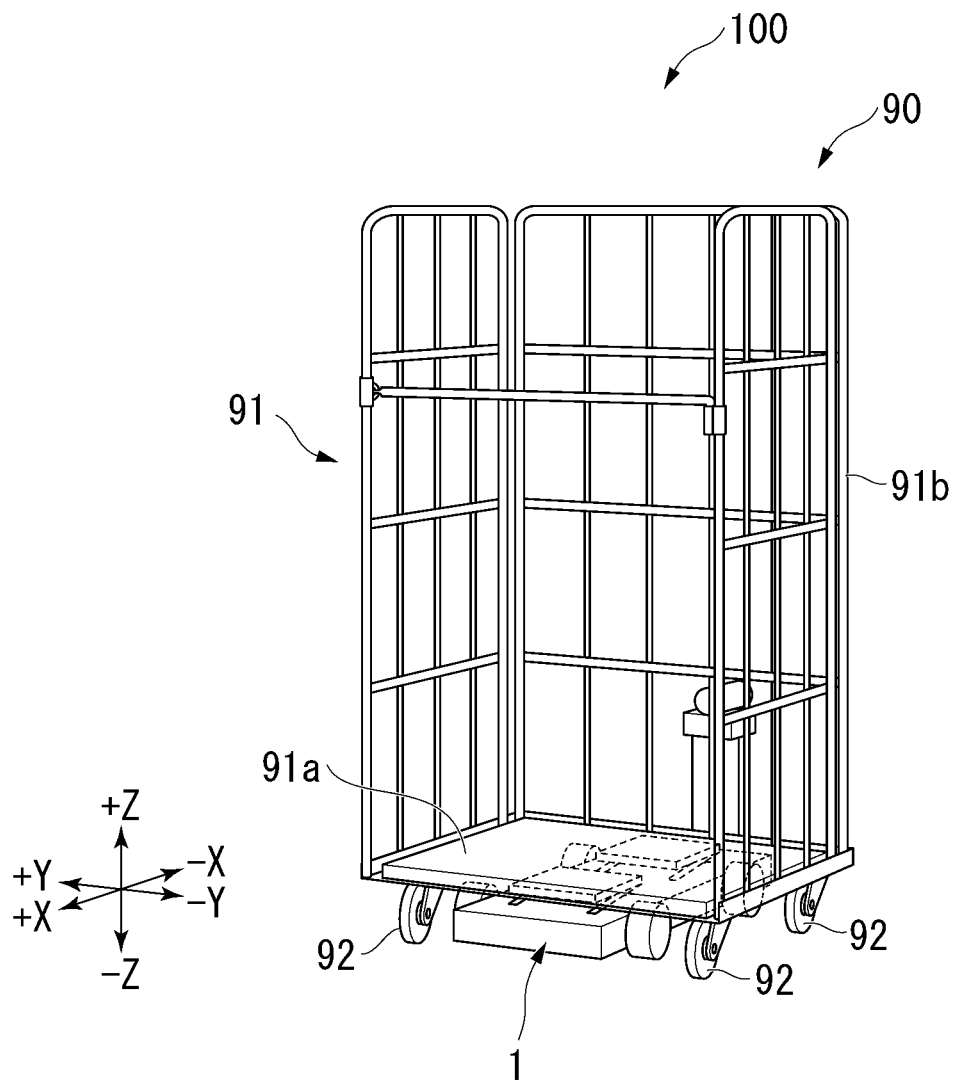
FIG. 1 is a perspective view showing an example of an unmanned transport vehicle 1 of a first embodiment and a cart 90.

An unmanned transport vehicle according to an embodiment includes a vehicle body, a moving mechanism, and an operation control device. The vehicle body is combinable with a transport object. The moving mechanism causes the vehicle body to be moved. The operation control device controls an operation of the moving mechanism. The operation control device includes a pseudo-reference position setter, a path acquirer, an operation command generator, and a driving controller. The pseudo-reference position setter sets a pseudo-reference position serving as an operation reference position of a combination structure of the vehicle body and the transport object to be different from a vehicle body reference position that is an operation reference position of the vehicle body. The path acquirer acquires a movement path from a current position of the combination structure to a target position. The operation command generator determines an operation of the combination structure that moves along the movement path acquired by the path acquirer based on the pseudo-reference position and generates an operation command related to a vehicle body operation that implements the determined operation of the combination structure. The driving controller causes the moving mechanism to be driven based on the operation command.

Hereinafter, an unmanned transport vehicle, a method of controlling the unmanned transport vehicle, and a storage medium according to embodiments will be described with reference to the drawings. In the following description, components having the same or similar functions are denoted by the same reference signs. Redundant description of the components may be omitted. In the present application, the term "based on XX" means "at least based on XX" and also includes cases based on other elements in addition to XX. The term "based on XX" is not limited to a case in which XX is used directly and also includes a case based on calculated or processed XX. "XX" is any element (for example, any information).

First, a +X direction, a −X direction, a +Y direction, a −Y direction, a +Z direction, and a −Z direction are defined. The +X direction, the −X direction, the +Y direction, and the −Y direction are directions along a floor surface on which the unmanned transport vehicle moves. The +X direction is, for example, one movement direction of an unmanned transport vehicle 1 and may be referred to as a "forward direction". The +X direction is an example of a "first direction". The −X direction is opposite to the +X direction and may be referred to as a "backward direction". When the +X direction and the −X direction are not distinguished, they are simply referred to as an "X direction". The +Y direction and the −Y direction are directions intersecting (for example, substantially orthogonal to) the X direction and may be referred to as a vehicle width direction of a vehicle main body 10 or a "side direction". The +Y direction and the −Y direction are opposite to each other. The +Y direction is an example of a "second direction". The −Y direction is an example of a "third direction". When the +Y direction and the −Y direction are not distinguished, they are simply referred to as a "Y direction". The +Z direction and the −Z direction are directions intersecting (for example, substantially orthogonal to) the X direction and the Y direction and are, for example, vertical directions. The +Z direction is an upward direction. The −Z direction is a direction opposite to the +Z direction. When the +Z direction and the −Z direction are not distinguished, they are simply referred to as a "Z direction". The terms "forward direction", "backward direction", "side direction", "vehicle width direction" and the like in the present specification are represented by a viewpoint based on one movement direction of the unmanned transport vehicle 1 for convenience of description. However, a movement direction of the unmanned transport vehicle 1 is not limited to the +X direction. The unmanned transport vehicle 1 may be movable in the −X direction, the +Y direction, and the −Y direction. Thus, the "first direction", the "second direction", and the "third direction" in the present application are not limited to the +X direction, the +Y direction, and the −Y direction, respectively, and different directions may correspond thereto.

First Embodiment

Figure 2:
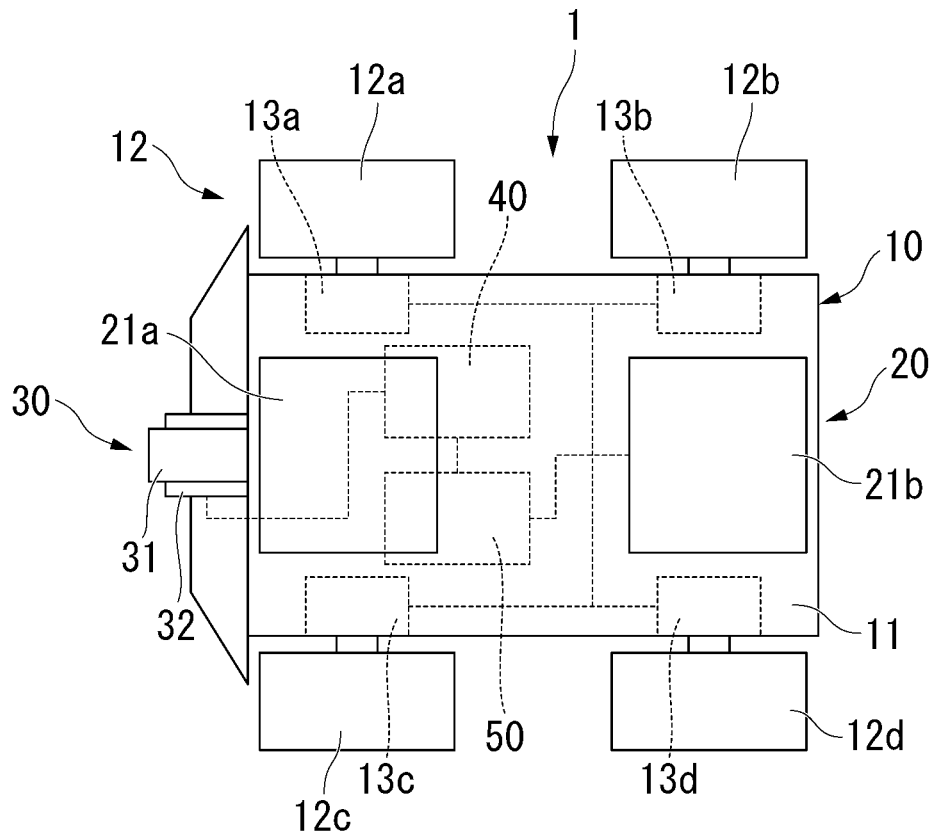
FIG. 2 is a plan view of the unmanned transport vehicle 1 of the first embodiment.
Figure 3:
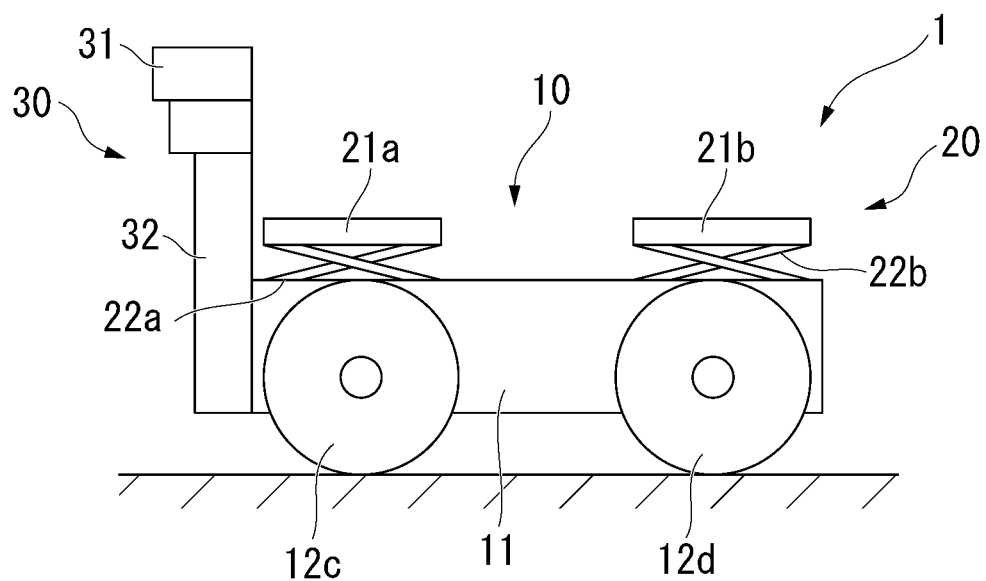
FIG. 3 is a side view of the unmanned transport vehicle 1 of the first embodiment.

FIG. 1 is a perspective view showing an example of an unmanned transport vehicle 1 of a first embodiment and a cart 90 which is a transport object, FIG. 2 is a plan view of the unmanned transport vehicle 1 of the first embodiment, and FIG. 3 is a side view of the unmanned transport vehicle 1 of the first embodiment. The unmanned transport vehicle 1 is, for example, an autonomous movement cart that does not require steering by an operator. The unmanned transport vehicle 1 is, for example, a low-floor automatic guided vehicle (AGV). However, the unmanned transport vehicle 1 may be of a lineless type in which a line drawn on the floor surface is unnecessary. The unmanned transport vehicle 1 goes under the cart 90 and is combined with the cart 90. A combination structure 100 is formed by the unmanned transport vehicle 1 and the cart 90 combined with the unmanned transport vehicle 1. The unmanned transport vehicle 1 is not limited to the above-described example and may be another type of unmanned transport vehicle. For example, the unmanned transport vehicle 1 may be steered by an operator. The unmanned transport vehicle 1 transports, for example, the cart 90 on which cargo is loaded within a work site.

The cart 90 is a transport object of the unmanned transport vehicle 1, and is, for example, a cage cart such as a roll box pallet (RBP). The unmanned transport vehicle 1 is combined with the cart 90. The cart 90 includes, for example, a loading part 91, casters (wheels) 92, and guide parts 93 (see FIG. 7).

The loading part 91 is a part on which cargo is loaded. The loading part 91 includes a loading plate 91a and a protection fence 91b. The loading plate 91a is, for example, a flat plate. The cargo is loaded on the loading plate 91a. The protection fence 91b stands, for example, upright along three sides of an outer edge of the loading plate 91a and one side surface (a surface facing in the +X direction) is open.

The casters 92 are attached to four corners of a back surface of the loading plate 91a. The casters 92 support the loading part 91 from below. The casters 92 are a traveling unit. The casters 92 are all rotatable around a vertical axis and can change a traveling direction. The transport object is not limited to the cart 90. Thus, the loading part 91 may be generalized and referred to as a "transport object main body".

The guide parts 93 are provided on the back surface of the loading plate 91a of the cart 90. The guide part 93 has a concave shape in a downward direction (the −Z direction). A side surface of the guide part 93 is inclined in an upward direction. A plan-view shape of a top surface of the guide part 93 is rectangular. The top surface of the guide part 93 corresponds to a part of the back surface of the loading plate 91a.

As shown in FIG. 2, the unmanned transport vehicle 1 includes, for example, a vehicle main body 10, a lift mechanism 20, a sensor device 30, a cart detection device 40, and an operation control device 50. The vehicle main body 10 has a vehicle body case 11, which is a vehicle body, and a moving mechanism 12. A thickness of the vehicle main body 10 is a thickness in which the vehicle main body 10 can go under the loading part 91 of the cart 90. The vehicle body case 11 forms an outer shell of the vehicle main body 10. The moving mechanism 12 is a traveling mechanism provided with four wheels 12a to 12d respectively disposed at four corners of the vehicle main body 10 and motors 13a to 13d configured to drive the wheels 12a to 12d. The motors 13a to 13d are connected to the wheels 12a to 12d via axles, respectively.

The wheels 12a to 12d of the moving mechanism 12 are, for example, Mecanum wheels. The moving mechanism 12 moves the vehicle body case 11. The moving mechanism 12 is an omnidirectional moving mechanism movable in all directions by individually rotationally driving the wheels 12a to 12d in the motors 13a to 13d. The unmanned transport vehicle 1 can move in all directions by adjusting a rotational direction and a rotational speed of each wheel in the moving mechanism 12.

The moving mechanism 12 may be an omnidirectional moving mechanism having wheels other than Mecanum wheels, for example, omni wheels. The moving mechanism 12 may include a steering mechanism and may steer some or all of the wheels in addition to adjusting the rotational speed and the rotational direction of the wheels. Encoders are attached to axles respectively connecting the wheels 12a to 12d and the motors 13a to 13d and the rotational speeds of the wheels 12a to 12d can be consecutively measured.

As shown in FIG. 3, the lift mechanism 20 includes two lift plates 21a and 21b and lift mechanisms 22a and 22b for causing the lift plates 21a and 21b to be lifted and lowered. The lift plates 21a and 21b have the same shape as each other. A shape of each of the lift plates 21a and 21b is a rectangular plate shape in a plan view and is the same as a shape of the top surface of the guide part 93 in a plan view. The lift plates 21a and 21b are provided on the bottom surface of the cart 90 and are inserted into the downwardly concaved guide parts 93 so that a relative positional relationship of the unmanned transport vehicle 1 with respect to the cart 90 is fixed. The lift plates 21a and 21b and the lift mechanism 22 are a combiner.

The lift mechanisms 22a and 22b include link mechanisms and actuators. In the lift mechanisms 22a and 22b, the link mechanisms are expanded and contracted in the vertical direction (the ±Z direction) by operating the actuators. The lift plates 21a and 21b can be lifted and lowered by extension and contraction of the link mechanisms in the lift mechanisms 22a and 22b. When the lift plates 21a and 21b are lowered to the lowermost end (moved in the −Z direction) by the lift mechanisms 22a and 22b, the heights of the lift plates 21a and 21b are disposed at a position lower than that of the lower surface (the bottom surface) of the cart 90.

In the lift mechanisms 22a and 22b, the lift plates 21a and 21b lift the top surface of the guide part 93 (the bottom surface of the loading part 91) of the cart 90 to a load receiving height position. The load receiving height position is a height position of the loading part 91 in a state in which the weight of the loading part 91 is received by the lift plates 21a and 21b but the casters 92 are in contact with the ground. The caster 92 is provided with, for example, a buffer spring. The caster 92 can perform movement for an elastic force of the buffer spring in the vertical direction. Thus, although the lift plates 21a and 21b receive the weight of the loading part 91, the casters 92 are in contact with the ground.

The lift mechanism 20 lifts the lift plates 21a and 21b to the load receiving height position and the lift plates 21a and 21b receive and support the load of the loading part 91 and therefore the unmanned transport vehicle 1 and the cart 90 are combined to form a combination structure 100 (see FIG. 1). The lift mechanism 20 lowers the lift plates 21a and 21b from the load receiving height position, and a state in which the lift plates 21a and 21b support the loading part 91 is eliminated, so that the unmanned transport vehicle 1 and the cart 90 in the combination structure 100 are separated.

The guide part 93 inclines inward as it goes upward and therefore guides the lifted lift plates 21a and 21b to the surface of the ceiling of the guide part 93. Therefore, even when the unmanned transport vehicle 1 slightly deviates from a combination execution position to be described below, the lift plates 21a and 21b can be reliably guided to the top surface of the guide part 93.

The term "combination" described herein means a broad concept of "associating two objects" and corresponds to, for example, engaging with (for example, hooking to) the cart 90 or the like other than supporting the cart 90 (for example, lifting the cart 90 upward). For example, an engagement part protruding toward the cart 90 and configured to engage with the cart 90 may be provided.

As shown in FIG. 3, the sensor device 30 includes a distance sensor 31 and a support part 32. The support part 32 is provided on the vehicle main body 10 to support the distance sensor 31. The distance sensor 31 is, for example, a three-dimensional distance sensor such as a laser range finder (LRF) capable of radiating a laser toward the cart 90. The distance sensor 31 acquires detected distance information that is information about a distance from the cart 90 in the forward direction (the +X direction) in a process in which the unmanned transport vehicle 1 approaches the cart 90. The detected distance information is, for example, a result of measuring reflected waves of the laser when the laser is radiated to the cart 90, but is not limited thereto. The distance sensor 31 outputs the acquired detected distance information to the cart detection device 40. The unmanned transport vehicle 1 includes various types of sensors for simultaneous localization and mapping (SLAM) (not shown) and various types of sensors including encoder odometry and the like.

The cart detection device 40 includes a transport characteristics storage 41 and a transport object identifier 42. The transport object identifier 42 identifies the cart 90 whose distance has been detected by the distance sensor 31. The identification of the cart 90 is performed, for example, by measuring the distance from the cart 90 based on the detected distance information detected by the distance sensor 31 and selecting the cart 90 closest to the unmanned transport vehicle 1. Alternatively, the identification of the cart 90 may be performed by attaching a tag or the like for identifying a type to the cart 90 and reading the tag attached to the cart 90.

The transport characteristics storage 41 stores transport characteristics of the cart 90 for each type of cart 90. The transport characteristics include dimensional information about dimensions of the cart 90, combination information about a combination with the unmanned transport vehicle 1, and traveling unit information about the traveling unit provided on the cart 90. The transport characteristics storage 412 stores, for example, a height of the loading part 91 in the cart 90 (a height from the floor surface to the back surface of the loading plate 91a) and widths of the loading plate 91a (widths in the X direction and the Y direction) as dimension information. For example, the cart detection device 40 stores information about a shape and a size of the guide part 93 of the cart 90 and a position of the combiner from the unmanned transport vehicle 1 as combination information. For example, the cart detection device 40 stores respective intervals between the casters 92, a position of the wheel 92 on the back surface of the loading plate 91a, a type of wheel 92, and the like as the traveling unit information.

The transport object identifier 42 reads transport characteristics of the identified cart 90 from the transport characteristics storage 41 and outputs the information of the identified cart 90 and the transport characteristics of the identified cart 90 to the operation control device 50. The transport object identifier 42 may refer to, for example, the transport characteristics of the identified cart, determine whether or not the identified cart is suitable for the combination with the unmanned transport vehicle 1, and re-identify the cart 90 of the transport object when the identified cart is not suitable for the combination with the unmanned transport vehicle 1.

The cart detection device 40 may acquire transport characteristics from a three-dimensional distance acquired based on the detected distance information detected by the distance sensor 31. The cart detection device 40 generates transport characteristics information about the transport characteristics of the identified cart 90 and outputs the transport characteristics information to the operation control device 50. When there are a plurality of carts 90 whose distances are measured by the distance sensor 31, the cart 90 of the transport object may be identified by referring to the transport characteristics from the plurality of carts 90 or referring to distances from the unmanned transport vehicle 1 and the transport characteristics.

The operation control device 50 controls operations of the moving mechanism 12 and the lift mechanism 20. The operation control device 50 causes the unmanned transport vehicle 1 to be moved based on the detected distance information output by the distance sensor 31 and to go under the cart 90. The operation control device 50 causes the unmanned transport vehicle 1 to be moved until the positional relationship with the cart 90 becomes a prescribed positional relationship. After the unmanned transport vehicle 1 moves to a position where the positional relationship with the cart 90 becomes the prescribed positional relationship, the operation control device 50 causes the lift mechanism 20 to be operated, causes the lift plates 21a and 21b to be lifted to the load receiving height position, and supports the loading part 91 of the cart 90. The operation control device 50 controls an operation of the unmanned transport vehicle 1 supporting the cart 90. Thereafter, the operation control device 50 controls the operation of the unmanned transport vehicle 1 for transporting the cart 90 to a target position.

Figure 4:
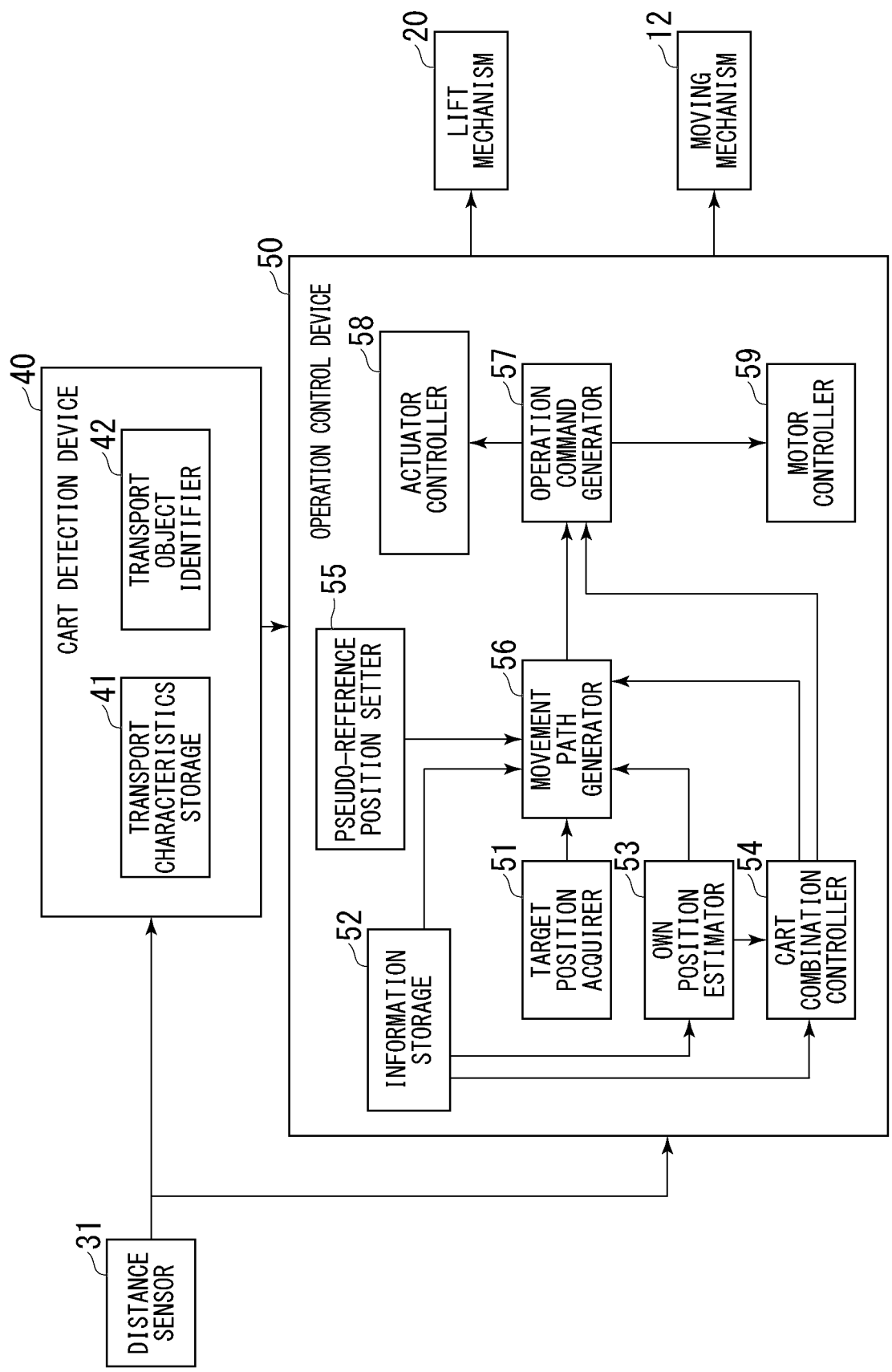
FIG. 4 is a block diagram showing a functional configuration of respective parts in the unmanned transport vehicle 1 of the first embodiment.

FIG. 4 is a block diagram showing a functional configuration of respective parts in the unmanned transport vehicle 1. As shown in FIG. 4, the operation control device 50 includes a target position acquirer 51, an information storage 52, an own position estimator 53, a cart combination controller 54, a pseudo-reference position setter 55, and a movement path generator 56, an operation command generator 57, an actuator controller 58, and a motor controller 59. For example, at least some of the respective functional units of the operation control device 50 (for example, the target position acquirer 51, the cart combination controller 54, the pseudo-reference position setter 55, the movement path generator 56, the operation command generator 57, the actuator controller 58 and the motor controller 59) are implemented by a hardware processor such as a central processing unit (CPU) or a graphics processing unit (GPU) executing a program (software) stored in the storage. Some or all of functional parts of the operation control device 50 may be implemented by hardware (a circuit part: circuitry) such as large scale integration (LSI), an application specific integrated circuit (ASIC), or a field-programmable gate array (FPGA) or may be implemented by cooperation between software and hardware.

The operation control device 50 includes an inverse kinematics (IK) function and a direct kinematics (DK) function. In the inverse kinematics function, a translational speed/turning angular speed at a representative position (here, a vehicle center position) is converted into a rotational angular speed of each axle. In the direct kinematics function, the rotational speed of each axle is converted into a translational speed/turning angular speed at a representative position. The operation control device 50 can control any cart speed at any timing by the inverse kinematics function and the direct kinematics function.

The target position acquirer 51 acquires a target position serving as a transport destination when the unmanned transport vehicle 1 transports the cart 90. For example, the target position acquirer 51 acquires a position of the transport destination of the cart 90 input by the operator using an input device (not shown) as the target position. Alternatively, the target position acquirer 51 acquires the position of the transport destination determined for each cart 90 and acquires the acquired position of the transport destination as the target position. The target position acquirer 51 outputs target position information about the acquired target position to the movement path generator 56. When the target position has been acquired, the target position acquirer 51 generates target position acquisition information indicating that the target position has been acquired and outputs the target position acquisition information to the cart combination controller 54.

The information storage 52 stores obstacle map information that is information about a map or an obstacle within a work site where the unmanned transport vehicle 1 transports the cart 90 and characteristics information of the unmanned transport vehicle 1. The obstacle map information includes, for example, information about a position of the cart 90 combined with the unmanned transport vehicle 1 such as a storage position of the cart 90, a wall or a pillar of a work site, a work tool such as a conveyor placed in the work site, and a sorting area for sorting cargo and information about a position and a size (a width) of a place to be avoided when the unmanned transport vehicle 1 transports the cart 90. The information storage 52 stores shape information about an outer shape (a shape) of the unmanned transport vehicle 1 such as the shape and size of the unmanned transport vehicle 1 as the characteristics information.

The own position estimator 53 reads obstacle information from the information storage 52 and uses time integration (dead reckoning) of a translational speed and a turning angular speed of the unmanned transport vehicle 1 and detected distance information output by the distance sensor 31 to perform matching with reference to the read obstacle map information and perform own position estimation. When the own position is estimated in the cart combination controller 54, another means may be used, for example, a GPS device may be used, or a device for detecting a position indication marker installed in a place where the unmanned transport vehicle 1 is used may be used. The own position estimator 53 outputs own position information about an own estimated position to the cart combination controller 54 and the movement path generator 56.

The cart combination controller 54 reads the obstacle information from the information storage 52. The cart combination controller 54 refers to the read obstacle map information based on the own position based on the own position information output by the own position estimator 53 and the distance information output by the distance sensor 31 and generates approach information for causing the unmanned transport vehicle 1 to approach the vicinity of the cart 90 serving as the transport object. The cart combination controller 54 outputs the generated approach information to the operation command generator 57. The cart combination controller 54 determines that the unmanned transport vehicle 1 has approached the cart 90 based on the detected distance information output by the distance sensor 31. The cart combination controller 54 generates combination execution position movement information for causing the unmanned transport vehicle 1 to move to a combination execution position based on the detected distance information output by the distance sensor 31 after the unmanned transport vehicle 1 approaches the vicinity of the cart 90.

The cart combination controller 54 outputs the generated combination execution position movement information to the operation command generator 57. The cart combination controller 54 lifts the cart 90 by the lift mechanism 20 of the unmanned transport vehicle 1 moved to the combination execution position and generates combination control information for combining the unmanned transport vehicle 1 with the cart 90. The cart combination controller 54 outputs the generated combination control information to the operation command generator 57. When the unmanned transport vehicle 1 lifts the cart 90 by the lift mechanism 20, the unmanned transport vehicle 1 is located at a position where the lift plates 21a and 21b of the lift mechanism 20 are disposed at the combination position. The combination execution position refers to a position of the unmanned transport vehicle 1 (a relative position relative to the cart 90) when the lift plates 21a and 21b are located at the combination position. The combination position refers to a position where the lift plates 21a and 21b on the back surface of the loading plate 91a in the loading part 91 of the cart 90 are combined.

The pseudo-reference position setter 55 acquires the transport characteristics information output by the cart detection device 40. The pseudo-reference position setter 55 acquires the transport characteristics of the cart 90 to be combined based on the acquired transport characteristics information. The pseudo-reference position setter 55 also reads the characteristics information of the unmanned transport vehicle 1 stored in the information storage 52. The pseudo-reference position setter 55 sets a pseudo-reference position based on the acquired transport characteristics and the read characteristics information. Thus, the pseudo-reference position setter 55 sets the pseudo-reference position, which is the operation reference position of the combination structure 100, to a position different from a vehicle body reference position, which is an operation reference position of the unmanned transport vehicle 1 with which the cart 90 is not combined. The pseudo-reference position setter 55 outputs pseudo-reference position information about the set pseudo-reference position to the movement path generator 56.

The movement path generator (the movement path acquirer) 56 generates and acquires a movement path from a current position of the combination structure 100 to a target position that is a transport destination. When target position information is output by the target position acquirer 51, the obstacle map information is read from the information storage 52. The movement path generator 56 generates movement path information about a movement path of the unmanned transport vehicle 1 based on the own position based on the own position information output by the own position estimator 53, the target position based on the target position information, and the obstacle map based on the obstacle map information. When the target position is given, the movement path generator 56 generates a path from the current position to the target position depending on the obstacle map. The movement path generator 56 outputs the generated movement path information to the operation command generator 57.

The operation command generator 57 generates approach operation command information for operating the motors 13a to 13d in the moving mechanism 12 to cause the unmanned transport vehicle 1 to approach the cart 90 based on the approach information output by the cart combination controller 54. The operation command generator 57 outputs the generated approach information to the motor controller 59.

The operation command generator 57 generates combination execution position movement command information for causing the motors 13a to 13d to be operated in the moving mechanism 12 in order to move the unmanned transport vehicle 1 under the cart 90 and move it to the combination execution position based on the combination execution position movement information output by the cart combination controller 54. The operation command generator 57 outputs the generated combination execution position movement command information to the motor controller 59.

The operation command generator 57 generates lifting/lowering command information for causing the actuator to be operated in the lift mechanism 20 based on the combination control information output by the cart combination controller 54. The operation command generator 57 outputs the generated lifting/lowering command information to the actuator controller 58. The operation command generator 57 has a position control function of making the arrival at a target position possible with a speed output for following a generated path based on the movement path information output by the movement path generator 56.

The operation command generator 57 generates an operation command according to a vehicle body operation for the combination structure 100 to move to the target position based on the movement path information output by the movement path generator 56 and the pseudo-reference position information output by the pseudo-reference position setter 55. The operation command generator 57 generates operation command information according to the operation command related to the vehicle body operation.

When the operation command related to the vehicle body operation is obtained, the operation command generator 57 first determines a combination structure operation related to the operation of the combination structure 100 based on the movement path information and the pseudo-reference position information output by the pseudo-reference position setter 55. The operation command generator 57 obtains the vehicle body operation by converting the determined combination structure operation based on the pseudo-reference position information. The conversion from the combination structure operation into the vehicle body operation will be described below.

The operation command generator 57 generates target position movement command information for causing the motors 13a to 13d to be operated so that movement according to the generated operation command information is implemented. The operation command generator 57 outputs the generated target position movement command information to the motor controller 59.

The actuator controller 58 controls the actuator in the lift mechanism 20 based on the lifting/lowering command information output by the operation command generator 57. As the actuator operates under control of the actuator controller 58, the lift plates 21a and 21b move in an upward/downward direction.

The motor controller 59 controls the motors 13a to 13d and causes the wheels 12a to 12d to rotate based on the approach operation command information, the combination execution position movement command information, or the target position movement command information output by the operation command generator 57. The motor controller 59 is a driving controller. Specifically, the motor controller 59 generates a motor rotational speed command value when the unmanned transport vehicle 1 approaches the cart 90 based on the approach operation command information output by the operation command generator 57. The motor controller 59 generates the motor rotational speed command for moving the unmanned transport vehicle 1 under the cart 90 and moving it to the combination execution position based on the combination execution position movement command information output by the operation command generator 57. The motor controller 59 generates a motor rotational speed command value when the combination structure 100 moves to the target position based on the target position movement command information output by the operation command generator 57. The motor controller 59 controls the motors 13a to 13d according to the generated motor rotational speed command value and causes the wheels 12a to 12d to rotate.

Figure 5:
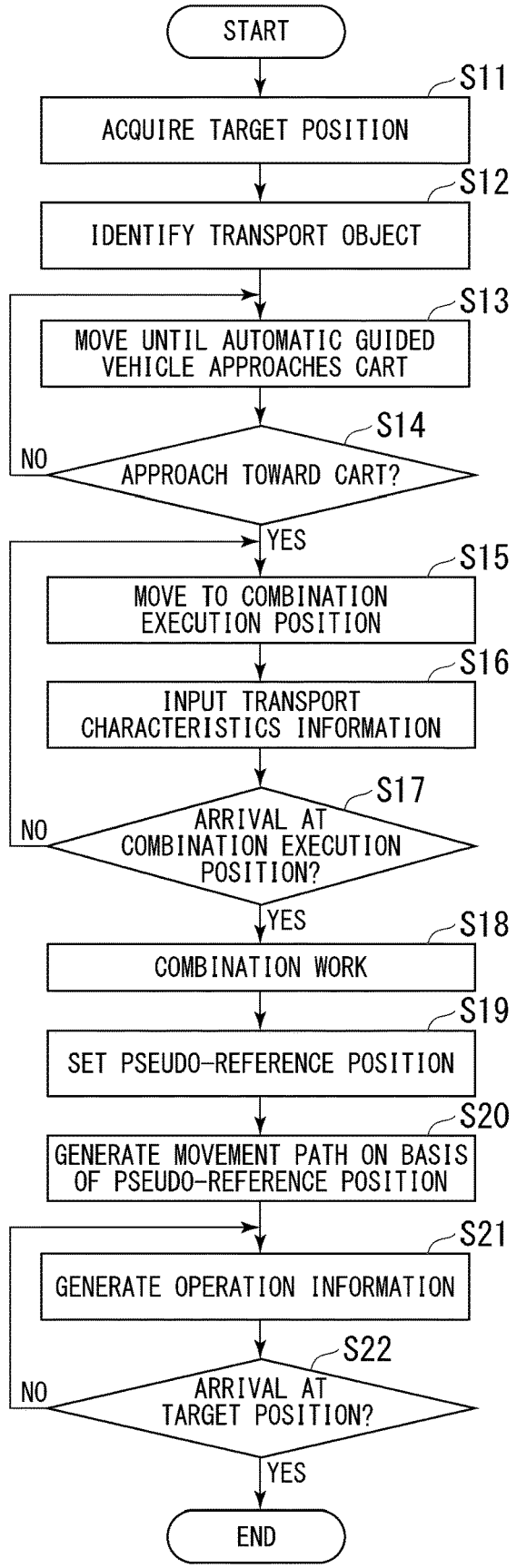
FIG. 5 is a flowchart showing an example of a flow of a process in an operation control device 50 of the first embodiment.

Next, a process in the operation control device 50 will be described. FIG. 5 is a flowchart showing an example of a flow of the process in the operation control device 50. As shown in FIG. 5, the operation control device 50 acquires a target position in the target position acquirer 51 (step S11). The target position is determined, for example, by the input from the operator to the input device. The target position acquirer 51 acquires a target position based on the information output from the input device.

The operation control device 50 identifies a cart serving as a transport object based on information output by the cart detection device 40 (step S12). Subsequently, the operation control device 50 causes the unmanned transport vehicle 1 to move in a direction in which the unmanned transport vehicle 1 approaches the identified cart 90 (step S13). When the unmanned transport vehicle 1 is moved, the operation control device 50 generates approach information in the cart combination controller 54. The cart combination controller 54 outputs the generated approach information to the operation command generator 57 and the operation command generator 57 outputs approach operation command information for causing the unmanned transport vehicle 1 to approach the cart 90 to the motor controller 59. The cart combination controller 54 generates the approach information on the assumption that the unmanned transport vehicle 1 travels alone. The unmanned transport vehicle 1 approaches the cart 90 by traveling based on the approach information.

The operation control device 50 determines whether or not the unmanned transport vehicle 1 has approached the cart 90 in the cart combination controller 54 (step S14). The cart combination controller 54 calculates a distance between the cart 90 and the unmanned transport vehicle 1 based on the detected distance information output by the distance sensor 31. Here, when the distance between the cart 90 and the unmanned transport vehicle 1 is less than a prescribed threshold value, it is determined that the unmanned transport vehicle 1 has approached the cart. When the distance between the cart 90 and the unmanned transport vehicle 1 is greater than or equal to the prescribed threshold value, it is determined that the unmanned transport vehicle 1 has not approached the cart.

Figure 6:
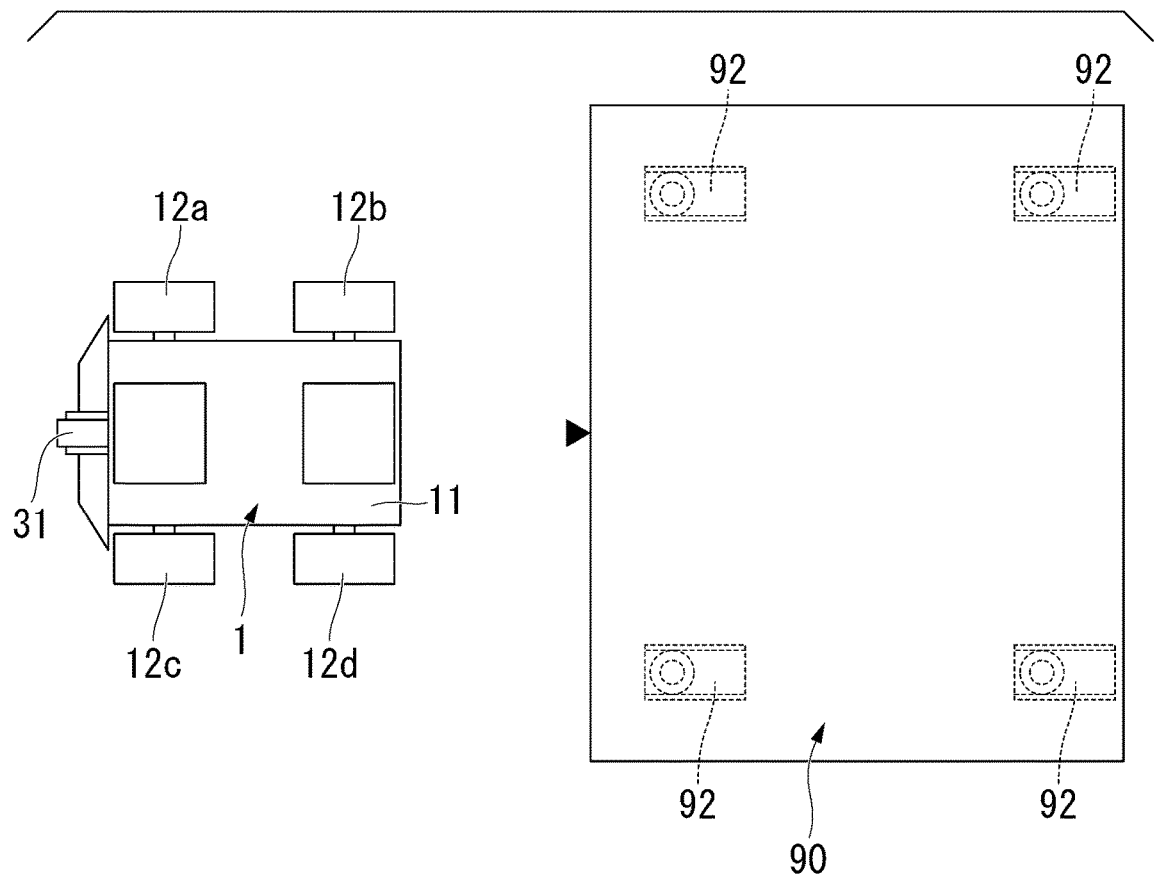
FIG. 6 is a plan view of the unmanned transport vehicle 1 of the first embodiment before the unmanned transport vehicle 1 is combined with the cart 90.
Figure 7:
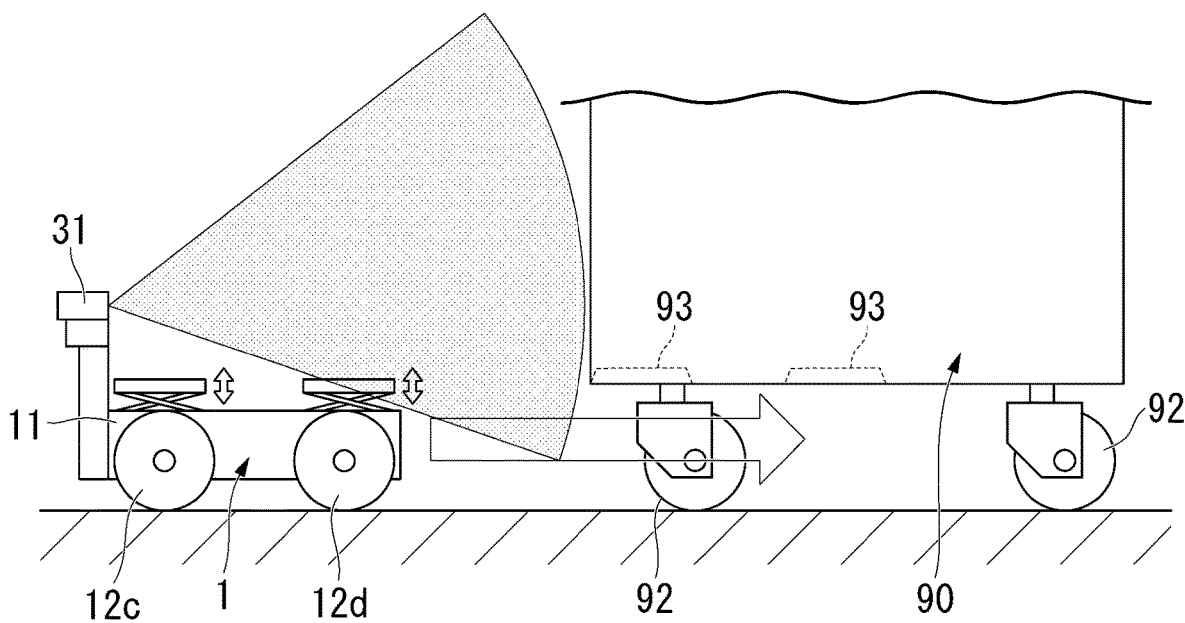
FIG. 7 is a side view of the unmanned transport vehicle 1 of the first embodiment before the unmanned transport vehicle 1 is combined with the cart 90.

When it is determined that the unmanned transport vehicle 1 has not approached the cart (step S14: NO), the cart combination controller 54 returns to step S13 and causes the unmanned transport vehicle 1 to approach the cart 90. When it is determined that the unmanned transport vehicle 1 has approached the cart 90 (YES in step S14), the operation control device 50 causes the unmanned transport vehicle 1 to be moved to the combination execution position as shown in FIGS. 6 and 7 (step S15).

When the unmanned transport vehicle 1 is moved to the combination execution position, the operation control device 50 generates the combination execution position movement information while measuring the distance between the unmanned transport vehicle 1 and the cart 90 based on the detected distance information output by the distance sensor 31 in the cart combination controller 54. The cart combination controller 54 outputs the generated combination execution position movement information to the operation command generator 57 and the operation command generator 57 outputs combination execution position movement command information for causing the unmanned transport vehicle 1 to be moved to the combination execution position to the motor controller 59. The unmanned transport vehicle 1 moves to the combination execution position by traveling based on the combination execution position movement information.

While the unmanned transport vehicle 1 approaches the cart 90 and reaches the combination execution position, the cart detection device 40 acquires transport characteristics of the cart 90 based on the detected distance information output by the distance sensor 31 and outputs transport characteristics information about the transport characteristics to the operation control device 50. The operation control device 50 inputs the transport characteristics information output by the cart detection device 40 in the pseudo-reference position setter 55 (step S16). The input of the transport characteristics information may be performed at a timing other than that of step S16 as long as the timing is before the pseudo-reference position is set (step S19) after the transport object is identified (step S12).

The operation control device 50 determines whether or not the unmanned transport vehicle 1 has reached the combination execution position in the cart combination controller 54 (step S17). The cart combination controller 54 determines whether the unmanned transport vehicle 1 has reached the combination execution position based on the detected distance information output by the distance sensor 31. When it is determined that the unmanned transport vehicle 1 has not reached the combination execution position (step S17: NO), the cart combination controller 54 returns to step S15 and the operation control device 50 causes the unmanned transport vehicle 1 to be moved to the combination execution position.

Figure 8:
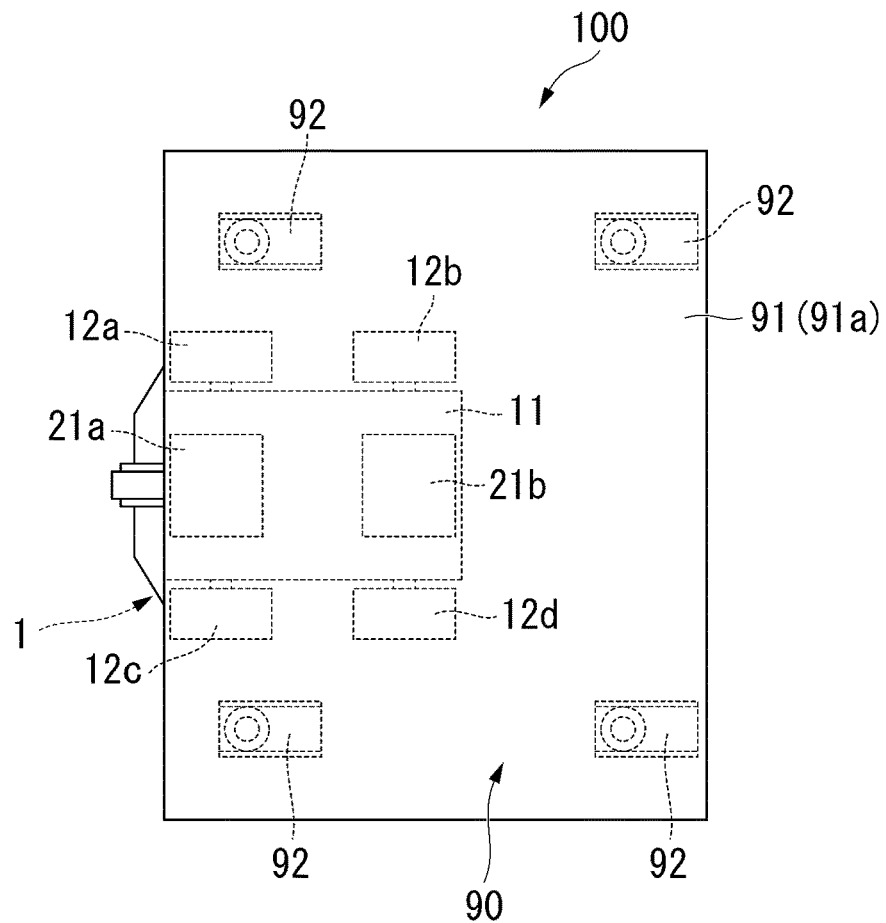
FIG. 8 is a plan view of the unmanned transport vehicle 1 of the first embodiment after the unmanned transport vehicle 1 is combined with the cart 90.
Figure 9:
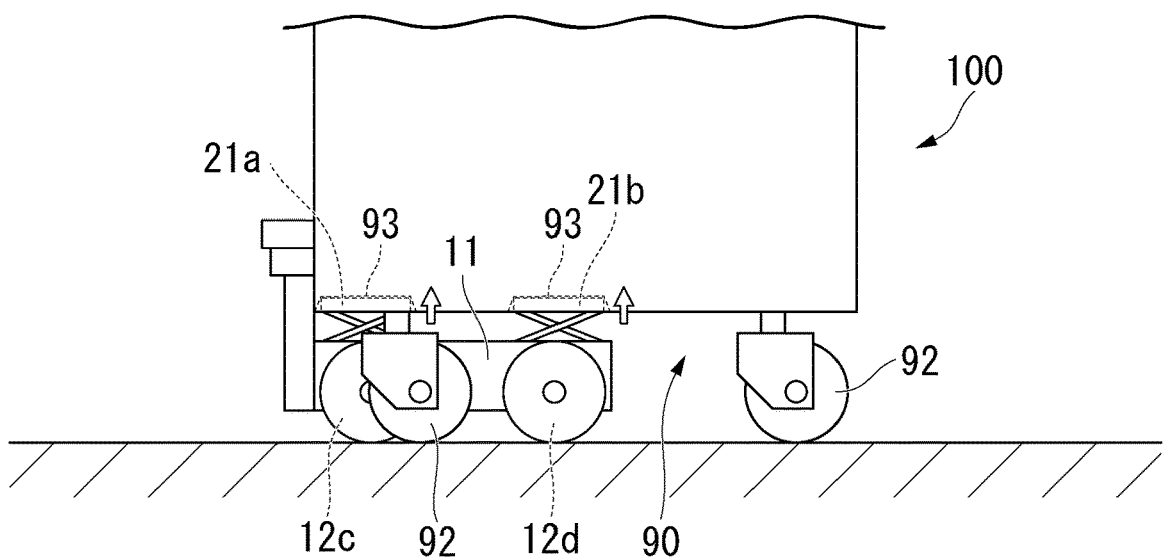
FIG. 9 is a side view of the unmanned transport vehicle 1 of the first embodiment after the unmanned transport vehicle 1 is combined with the cart 90.

When it is determined that the unmanned transport vehicle 1 has reached the combination execution position (step S17: YES), the operation control device 50 performs the work for combining the unmanned transport vehicle 1 with the cart 90 (step S18). The cart combination controller 54 in the operation control device 50 generates combination control information and outputs the combination control information to the operation command generator 57. The operation command generator 57 generates lifting/lowering command information in accordance with the combination control information and outputs the lifting/lowering command information to the actuator controller 58. The actuator controller 58 causes the actuator to be operated based on the lifting/lowering command information output by the operation command generator 57 and causes the lift plates 21*a* and 21*b* in the lift mechanism 20 to be lifted to the load receiving height position as shown in FIGS. 8 and 9. As the lift plates 21*a* and 21*b* are lifted to the load receiving height position, the lift plates 21*a* and 21*b* receive and support the load of the loading part 91. Thus, the unmanned transport vehicle 1 is combined with the cart 90. The wheels 12*a* to 12*d* in the cart 90 are in contact with the floor surface.

Thus, the lift mechanism 20 lifts up the cart 90 to a height at which the wheels 12*a* to 12*d* of the cart 90 are in contact with the floor surface although the lift plates 21*a* and 21*b* support the cart 90. Because the cart 90 is not completely lifted up and the wheels 12*a* to 12*d* are in contact with the floor surface, the stability of the cart 90 can be enhanced. On the other hand, because the cart 90 is lifted by a sufficient force from the lift mechanism 20, a vertically downward force is applied to the unmanned transport vehicle 1 as a reaction force. Therefore, because a grip force of the wheels 12*a* to 12*d* is improved, the wheels 12*a* to 12*d* are less likely to slip and the cart 90 on which cargo is mounted can be moved by a large force. Because the cage cart is lifted by a sufficient force from the lift mechanism 20, a frictional force between the lift plates 21*a* and 21*b* of the lift mechanism 20 and the back surface of the loading plate 91*a* of the cart 90 is also generated sufficiently. As a result, the unmanned transport vehicle 1 and the cart 90 are integrated and regarded as a rigid body moving on the floor surface. When the cart 90 is lifted up by the lift mechanism 20, the casters 92 may be separated from the floor surface and brought into a completely lifted state. The casters 92 may be separated from the floor surface and brought into a completely lifted state, for example, on the condition that the cart 90 can be supported by the lift mechanism 20 in a well-balanced state.

When the work of combining the unmanned transport vehicle 1 with the cart 90 is completed, the operation control device 50 sets a pseudo-reference position in the pseudo-reference position setter 55 (step S19). The operation control device 50 sets the pseudo-reference position based on transport characteristics acquired based on the transport characteristics information of the cart 90 output by the cart detection device 40 and the characteristics information of the unmanned transport vehicle 1 read from the information storage 52.

Figure 10:
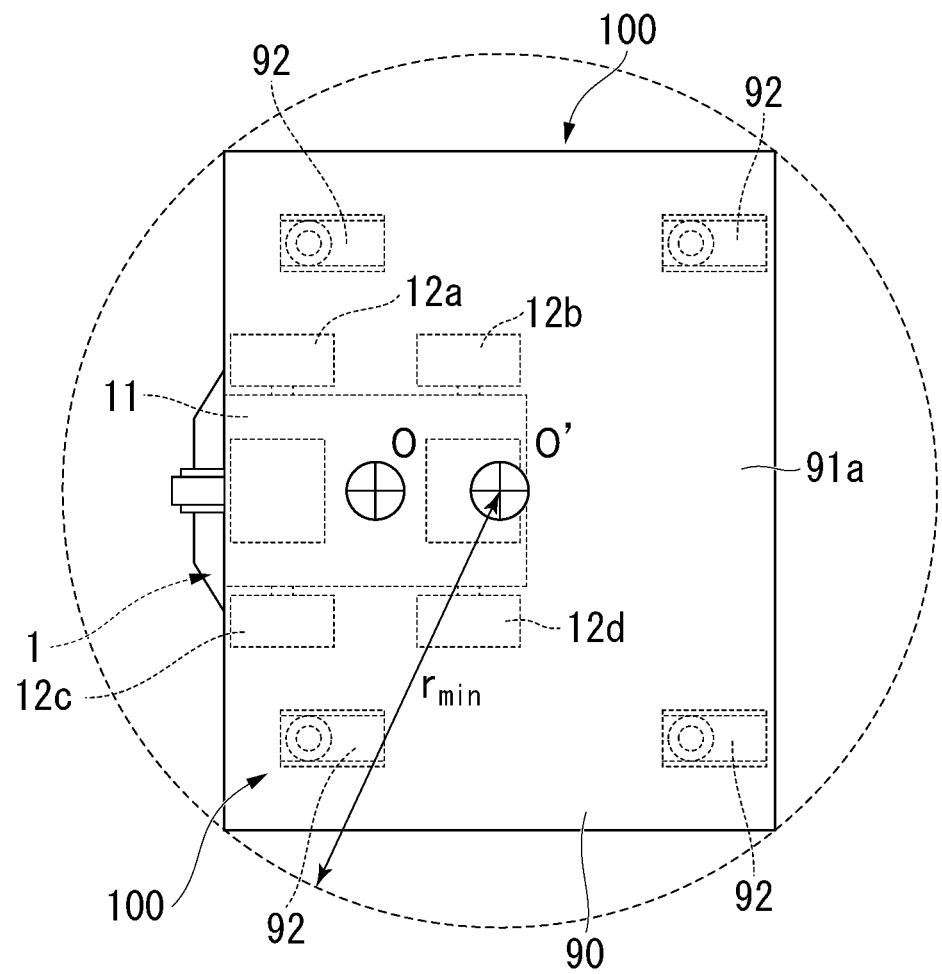
FIG. 10 is a diagram showing a reference operation position of the unmanned transport vehicle 1 of the first embodiment.

Here, the pseudo-reference position will be described. For example, when the unmanned transport vehicle 1 travels alone, an operation reference position (hereinafter referred to as a "vehicle body reference position") based on the shape of the unmanned transport vehicle 1 is set. For example, as shown in FIG. 10, a motion center position of the unmanned transport vehicle 1 is set as the vehicle body reference position of the unmanned transport vehicle 1. For example, the motion center position of the unmanned transport vehicle 1 can be set to a center position of a circumscribed circle having a minimum radius with respect to the unmanned transport vehicle 1 when the unmanned transport vehicle 1 is viewed in a plan view. The motion center position of the unmanned transport vehicle 1 is set as the vehicle body reference position O and the operation of the unmanned transport vehicle 1 can be generated by generating the operation of the vehicle body reference position.

On the other hand, even in the combination structure 100, the motion center position of the combination structure 100 is set as the operation reference position and an operation of the operation reference position (hereinafter referred to as a "pseudo-reference position") of the combination structure 100 is generated and therefore an operation of the combination structure 100 can be generated. As shown in FIG. 10, the motion center position of the combination structure 100 is the center of the circumscribed circle having a minimum radius rmin with respect to the combination structure 100. The pseudo-reference position setter 55 identifies the outer shape of the combination structure 100 based on the shape of the unmanned transport vehicle 1 obtained from the characteristics information of the unmanned transport vehicle 1 and the transport characteristics of the cart 90. The pseudo-reference position setter 55 generates the circumscribed circle having the minimum radius rmin with respect to the combination structure 100 from the identified outer shape of the combination structure 100 and sets a central point of the generated circumscribed circle as the pseudo-reference position O' of the combination structure 100.

Subsequently, the operation control device 50 generates a movement path of the combination structure 100 in the movement path generator 56 (step S20). The movement path generator 56 generates a path that connects the target position acquired by the target position acquirer 51 and the own position estimated by the own position estimator 53 and does not collide (make contact) with an obstacle as a movement path. For example, the movement path may be a shortest path among paths that connect the target position acquired by the target position acquirer 51 and the own position estimated by the own position estimator 53 and do not collide (make contact) with an obstacle or a movement path suitable for traveling performance of the unmanned transport vehicle 1. The movement path may be another path.

Subsequently, the operation control device 50 generates operation command information of the unmanned transport vehicle 1 when the combination structure 100 moves along the movement path in the operation command generator 57 (step S21). When the combination structure 100 is operated by driving the wheels of the combination structure 100 (the wheels 12a to 12d of the unmanned transport vehicle 1 and the casters 92 of the cart 90), it is only necessary to obtain a combination structure operation of causing the combination structure 100 to be operated based on the pseudo-reference position as in a case in which a vehicle body operation of causing the unmanned transport vehicle 1 to be operated based on the vehicle body reference position is obtained. However, in the combination structure 100, the caster 92 is not driven only in a driven type and the combination structure 100 is operated mainly by the wheels 12a to 12d of the unmanned transport vehicle 1.

Therefore, the operation command generator 57 generates a vehicle body operation in which the unmanned transport vehicle 1 travels alone and a combination structure operation in which the unmanned transport vehicle 1 travels as the combination structure 100 and generates operation command information by converting the combination structure operation into the vehicle body operation. Specifically, the operation command generator 57 generates the operation command information according to the following procedure.

When the unmanned transport vehicle 1 travels alone, the operation command generator 57 determines a consecutive movement target position along the movement path, a posture (an own posture) of the unmanned transport vehicle 1, and the like. The operation command generator 57 estimates an own position and an own position posture (an own estimated position posture) based on information obtained from various sensors such as SLAM and encoder odometry (not shown) and obtains a movement direction and a movement speed of the vehicle body reference position O as the vehicle body operation based on a deviation of the own estimated position posture at the own position.

When the unmanned transport vehicle 1 travels as the combination structure 100, the operation command generator 57 determines the movement target position of a pseudo-reference position O' along the movement path, the posture (the own posture) of the combination structure 100, and the like. The operation command generator 57 converts an own position and an own estimated position posture in the unmanned transport vehicle 1 alone into an own position (an own pseudo-position) and an own posture (an own estimated pseudo-posture) at the own pseudo-position in the combination structure 100 by a conversion equation when the vehicle body reference position O of the unmanned transport vehicle 1 is converted into the pseudo-reference position O' of the combination structure 100.

Then, the operation command generator 57 obtains the movement direction and the movement speed of the combination structure 100 as the combination structure operation based on the deviation of the own estimated pseudo-posture at the own pseudo-position. The operation command generator 57 converts the movement direction and the movement speed of the pseudo-reference position O' into the movement direction and the movement speed of the vehicle body reference position O when the unmanned transport vehicle 1 travels to generate the movement direction and the movement speed of the vehicle body reference position O when the unmanned transport vehicle 1 travels by performing the inverse conversion according to an inverse conversion equation relative to the conversion equation when the vehicle body reference position O is converted into the pseudo-reference position O'. The operation command generator 57 generates target position movement command information according to the movement direction and movement speed of the generated vehicle body reference position O and outputs the target position movement command information to the motor controller 59. The motor controller 59 controls the motors 13a to 13d based on the output target position movement command information, causes the wheels 12a to 12d to be rotated, and causes the combination structure 100 to be moved.

Thereafter, the operation control device 50 determines whether or not the combination structure 100 has reached the target position (step S22). It is determined whether or not the target position has been reached, for example, by referring to the obstacle map in the movement path generator 56, based on whether or not the own position is the target position. When it is determined that the combination structure 100 has not reached the target position (step S22: NO), the operation control device 50 returns to step S21 and continues the movement to the target position. When it is determined that the combination structure 100 has reached the target position (step S22: YES), the operation control device 50 ends the process of the flow shown in FIG. 5.

According to the configuration as described above, an optimum movement operation can be calculated as a movement operation of the unmanned transport vehicle 1 with respect to the combination structure 100 in which the unmanned transport vehicle 1 and the cart 90 are integrated. Here, for example, although the unmanned transport vehicle 1 can pass through a space alone even if the movement operation is calculated in the unmanned transport vehicle 1 alone and the combination structure 100 is intended to be moved, there is a high possibility that the combination structure 100 will try to pass through a narrow passage in which passing is impossible or that the combined cart 90 will be largely swung and brought into contact with other obstacles by turning around the unmanned transport vehicle 1 and there may be a problem in that a wide movement space is required.

In this respect, the unmanned transport vehicle 1 generates an operation command for the wheels 12a to 12d based on the combination structure 100 integrated with the cart 90. Therefore, when the cart 90 is moved by the unmanned transport vehicle 1, contact with an obstacle or the like can be avoided and the efficiency of a transport movement operation can be improved.

In the present embodiment, the operation of the combination structure 100 is generated based on the pseudo-reference position of the combination structure 100 and the operation of the combination structure 100 is converted into the operation of the unmanned transport vehicle 1. Thus, because the operation of the unmanned transport vehicle 1 can be generated easily, the efficiency of a transport movement operation can be improved.

In the present embodiment, the pseudo-reference position O' is set based on the transport characteristics of the combination structure 100 and the operation of the combination structure 100 is acquired based on the pseudo-reference position O'. Thus, because the appropriate operation of the combination structure 100 can be acquired, a more efficient operation can be generated as the operation of the unmanned transport vehicle 1.

In the present embodiment, the central position of the circumscribed circle having a minimum radius with respect to the combination structure 100 is set as the pseudo-reference position. Thus, the pseudo-reference position can be easily set and an appropriate pseudo-reference position can be set. Therefore, a more efficient operation can be generated as the operation of the unmanned transport vehicle 1.

The caster 92 provided on the above-described cart 90 is a movable caster that can rotate around any vertical axis and change the traveling direction. However, there are a fixed caster whose traveling direction is constant and a movable caster as the caster 92. The fixed caster is a caster having a rotation prevention structure which cannot rotate around the vertical axis and has a fixed traveling direction in contact with the ground and which can be rotationally moved only in a prescribed traveling direction. The movable caster can convert the traveling direction and is a caster that can convert the traveling direction.

The operation control device 50 adjusts the driving force of the wheels 12a to 12d in accordance with the type of caster 92 provided on the cart 90. For example, the operation control device 50 increases the driving force for the wheel disposed in the vicinity of the fixed caster and decreases the driving force for the wheel disposed in the vicinity of the movable caster. By adjusting the driving force of the wheels 12a to 12d in accordance with the type of the caster 92 provided on the cart 90, the combination structure 100 can be driven with appropriate power.

As an environment in which the unmanned transport vehicle 1 is used, there is an environment in which a cart 90 in which all casters 92 are movable is mixed with a cart 90 having a fixed caster 92 and a movable caster 92. In an environment in which there are such a plurality of types of carts 90, the operation control device 50 may detect a driving torque when the caster 92 is rotated and identify the type of caster based on the detected driving torque. For example, after the unmanned transport vehicle 1 is combined with the cart 90, several test operations may be performed to determine and identify the type of caster. A procedure for determining the type of caster provided on the cart 90 will be described below.

Figure 11:
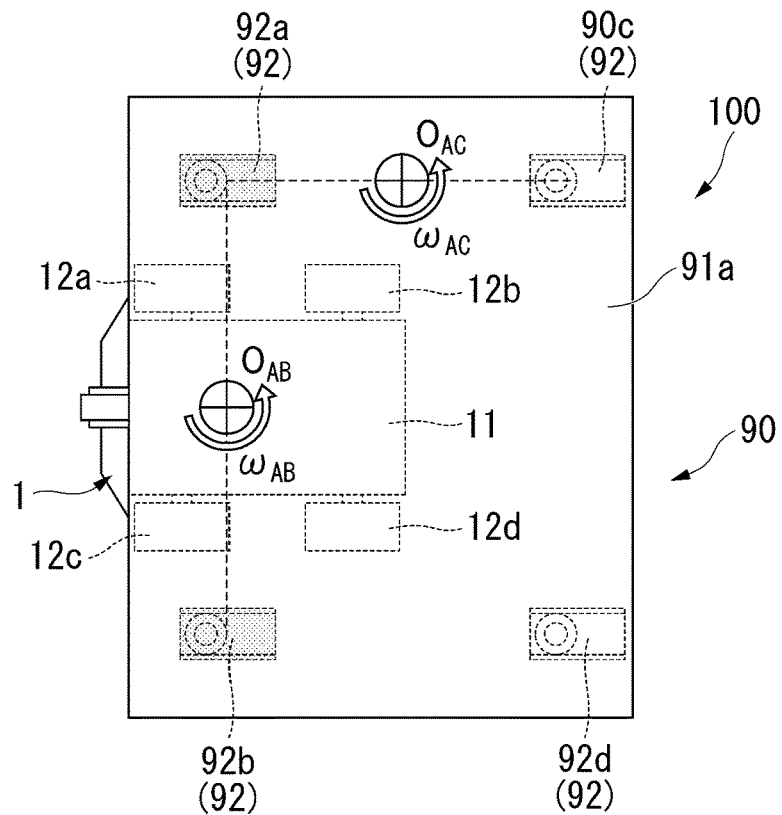
FIG. 11 is an explanatory diagram showing the unmanned transport vehicle 1 of the first embodiment.

For example, a shape of the cart 90 is acquired based on the detected distance information output by the distance sensor 31 before the cart 90 is combined with the unmanned transport vehicle 1. Subsequently, as shown in FIG. 11, the first caster 92a and the second caster 92b are selected as any two casters. The first caster 92a and the second caster 92b that have been selected are casters selected to set the rotational center of the rotational operation. At this point, it is unknown whether each caster 92 is a movable caster or a fixed caster. Subsequently, the operation control device 50 drives the wheels 12a to 12d and calculates a pseudo-rotational operation $\omega_{AC}$ centering on a central point $O_{AB}$ of the first caster 92a and the second caster 92b.

The operation control device 50 detects the driving torque applied to the wheels 12a to 12d when the pseudo-rotational operation $\omega_{AC}$ is performed. The detection of the driving torque may be performed using a torque sensor provided on the axle or may be substituted by monitoring a current value of a current supplied to the motors 13a to 13d for the rotation of the wheels 12a to 12d.

When the third caster 92c and the fourth caster 92d which are all casters other than the first caster 92a and the second caster 92b selected to set the rotational center of the rotational operation are movable castors, the casters of the third caster 92c and the fourth caster 92d can change their directions to follow the rotation direction with respect to the output of the rotational operation and can perform the rotational operation with a small torque.

On the other hand, when the third caster 92c and the fourth caster 92d include a fixed caster, the fixed caster whose direction cannot be changed becomes resistance, and a large torque is required to perform the rotational operation. Therefore, the operation control device 50 prepares an appropriate threshold value in a range larger than a torque required when the third caster 92c and the fourth caster 92d are free casters and smaller than a torque required in the case of the fixed caster. The operation control device 50 recognizes that the third caster 92c and the fourth caster 92d are movable casters when the turning operation is implemented with a torque less than or equal to the threshold value. When a torque greater than or equal to the threshold value is required to implement the turning operation, the operation control device 50 holds the determination while leaving the possibility that one or more fixed casters will be included in the third and fourth casters 92c and 92d.

Subsequently, the operation control device 50 newly selects two casters in a combination other than that of the first caster 92a and the second caster 92b selected to set the rotational center. For example, as shown in FIG. 11, the first caster 92a and the third caster 92c are selected. The operation control device 50 calculates a pseudo-rotational operation $\omega_{AC}$ in which the selected first caster 92a and third caster 92c turn at the central point $O_{AC}$ thereof. The operation control device 50 detects a driving torque applied to the wheels 12a to 12d when the pseudo-rotational operation is performed and identifies types of the second caster 92b and the fourth caster 92d according to a similar criterion.

Figure 12:
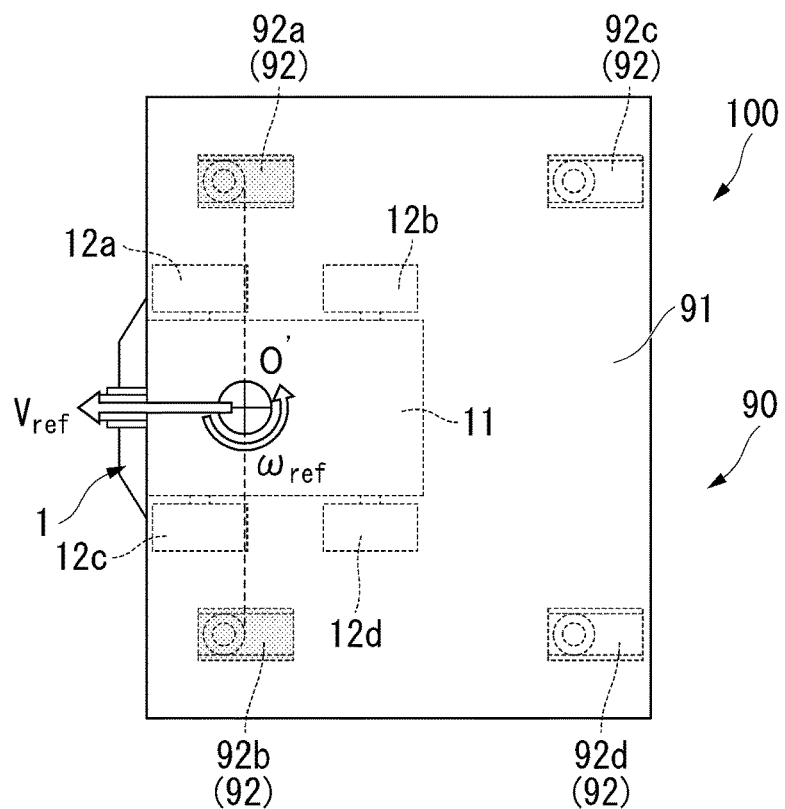
FIG. 12 is an explanatory diagram showing an unmanned transport vehicle 1 of a modified example of the first embodiment.

The operation control device 50 iterates such specific work and determines whether or not fixed casters can be identified by narrowing the fixed casters provided on the cart 90 down to two fixed casters 92. When the fixed casters can be identified by narrowing the fixed casters down to two fixed casters, the operation control device 50 plans a reaction movement operation using the fixed casters. For example, as shown in FIG. 12, when it is determined that the first caster 92a and the second caster 92b are fixed casters, the operation of the unmanned transport vehicle 1 is planned so that a rotational center is disposed at an intermediate position between the first caster 92a and the second caster 92b with respect to a rotation component $\omega_{ref}$. The operation of the unmanned transport vehicle 1 is planned so that a translation component $V_{ref}$ intersects (is orthogonal to) the arrangement of the first caster 92a and the second caster 92b.

Figure 13:
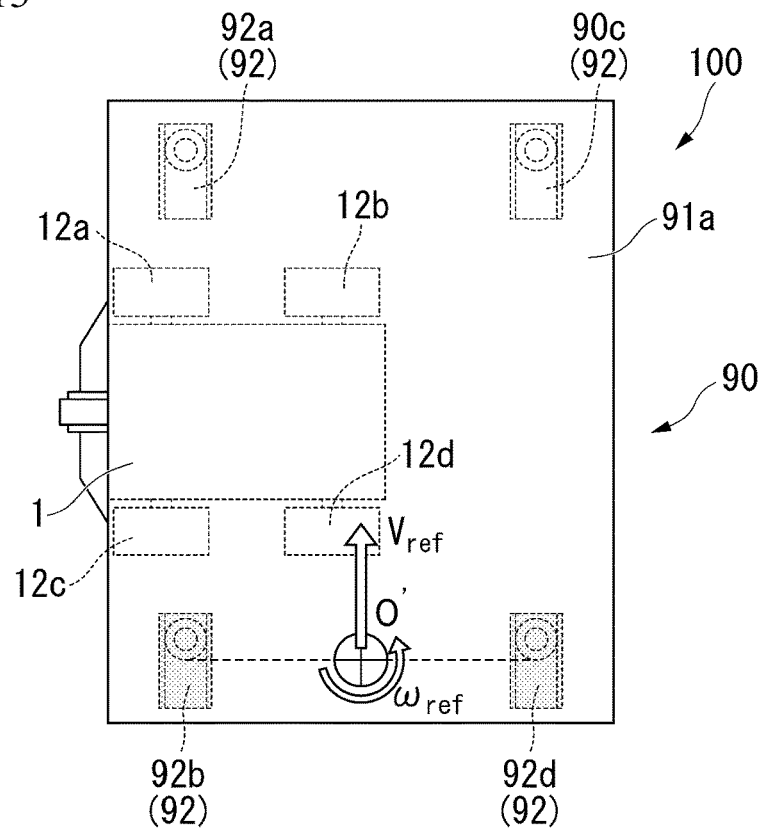
FIG. 13 is an explanatory diagram showing an unmanned transport vehicle 1 of a modified example of the first embodiment.

In the example shown in FIG. 12, a prescribed traveling direction of the first caster 92a and the second caster 92b that are fixed casters is a direction that intersects (is orthogonal to) a direction along an axial direction of the axles to which the wheels 12a to 12d are connected in the unmanned transport vehicle 1. On the other hand, as shown in FIG. 13, there is also a cart 90 in which the second caster 92b and the fourth caster 92d are fixed casters. In the case of the cart 90, the prescribed traveling direction of the second caster 92b and the fourth caster 92d is a direction along the axial direction of the axles to which the wheels 12a to 12d in the unmanned transport vehicle 1 are connected.

Figure 14:
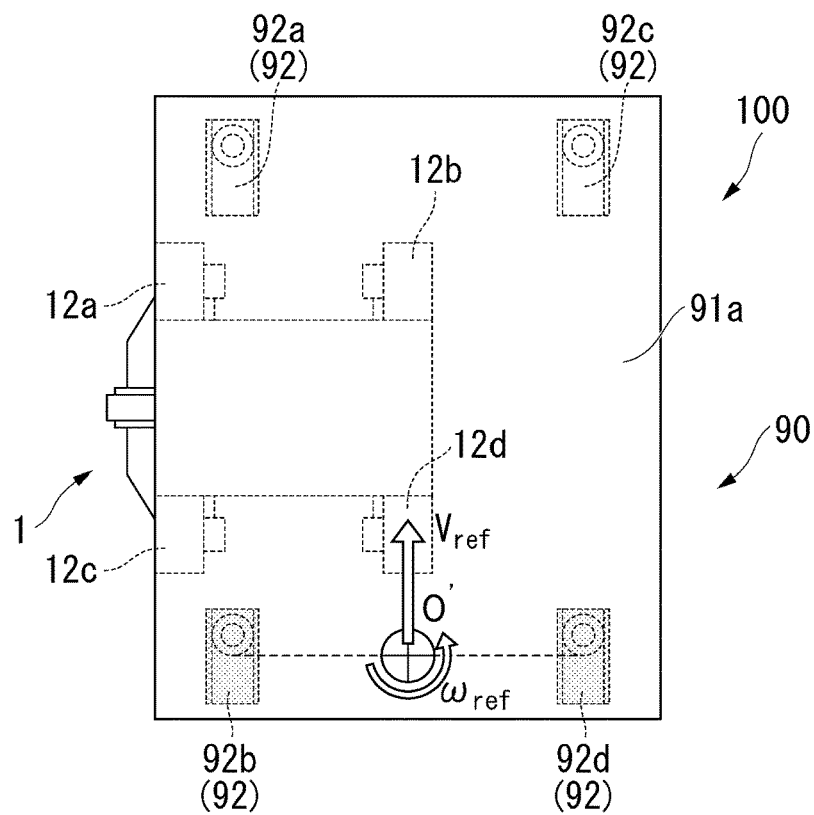
FIG. 14 is an explanatory diagram showing an unmanned transport vehicle 1 of a modified example of the first embodiment.

When such a cart 90 is transported, the operation of the unmanned transport vehicle 1 is planned so that the rotational center is disposed at an intermediate position between the second caster 92b and the fourth caster 92d with respect to the rotation component $\omega_{ref}$. The operation of the unmanned transport vehicle 1 is planned so that the translation component $V_{ref}$ intersects (is orthogonal to) the arrangement of the first caster 92a and the second caster 92b. As shown in FIG. 14, with respect to FIG. 13, it is possible to plan the operation of the unmanned transport vehicle 1 by changing the direction of the wheels 12a to 12d of the unmanned transport vehicle 1 and setting the rotation component $\omega_{ref}$ and the translation component $V_{ref}$. The operation of the unmanned transport vehicle 1 can be planned so that the rotational center is disposed at the intermediate position between the second caster 92b and the fourth caster 92d with respect to the rotation component $\omega_{ref}$.

The above-described procedure of identifying the caster 92 is an example, and the caster 92 may be identified by another procedure. Without setting the rotational center to the central point of the two casters, the caster may be identified as any one point on a straight line connecting the two casters 92. Alternatively, a type of caster may be identified by executing a rotational operation in which an intersection with a straight line intersecting (orthogonal to) a straight line connecting two casters 92 and passing through three casters 92 is set as the rotational center.

In the above-described example, as a premise, the fixed caster in the cart 90 is not located at a diagonal position but is located in parallel to one side of the cage cart. The traveling direction of the fixed caster is a direction orthogonal to the straight line passing through the two fixed casters. On the other hand, the above-described premise may not be required and a phase for estimating the traveling direction of the fixed caster may be provided. The traveling direction of the fixed caster may be estimated by preparing a translational operation as an output operation for identifying the type of caster and measuring a torque necessary for the translational operation as in the rotational operation when the traveling direction of the fixed caster is estimated.

There is a case in which the number of fixed caster candidates cannot be narrowed down to two in the above-described specific method and a case in which the translational operation output cannot be moved in an output of a predetermined threshold value or less in any direction. In these cases, for example, it may be estimated that the caster 92 is locked. When the caster 92 is locked, for example, the cart 90 serving as the transport object may be another cart 90. Alternatively, a caster lock alarm may be issued so that a nearby worker or operator unlocks the caster.

Second Embodiment

Figure 15:
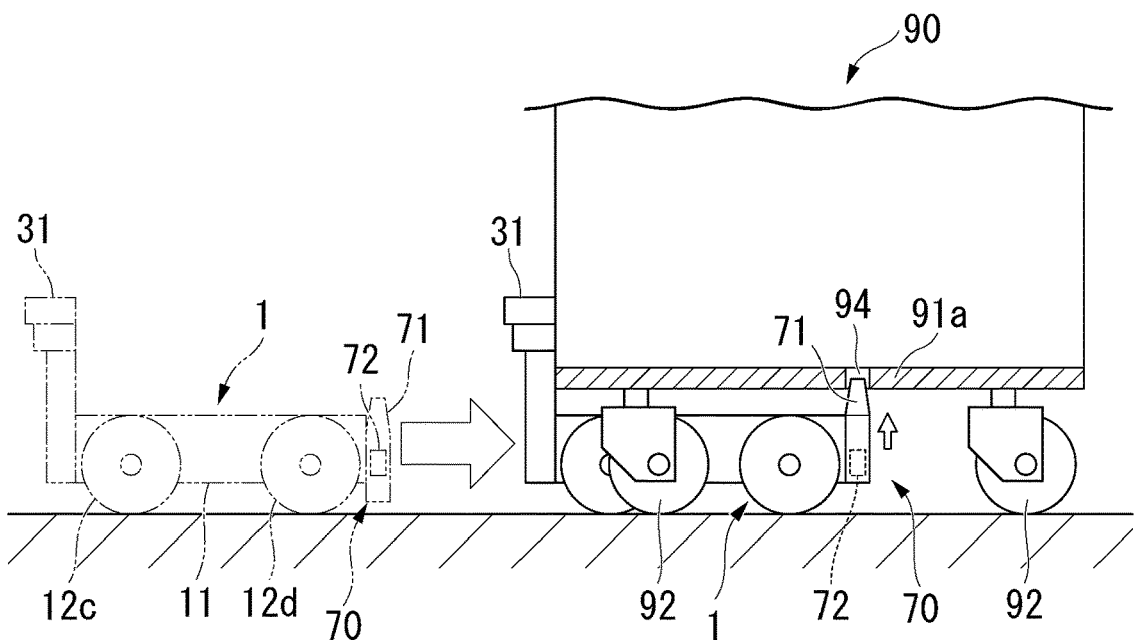
FIG. 15 is a side view showing an example of an unmanned transport vehicle 1 of a second embodiment and a cart 90.

Next, a second embodiment will be described with reference to FIG. 15. A combining device 70 is provided at an end of an unmanned transport vehicle 1 of the present embodiment. The combining device 70 includes a wedge member 71 and a wedge member lift device 72. The wedge member 71 is, for example, a columnar body having a square flat cross section and having a smaller cross-sectional area as the columnar body goes upward. The wedge member 71 is a convex part provided on the unmanned transport vehicle 1.

The wedge member lift device 72 is a device for causing the wedge member 71 to be moved upward and downward. The wedge member lift device 72 is vertically controlled by an operation control device 50. The combining device 70 is disposed on the side of a vehicle body case 11 of the unmanned transport vehicle 1. A vertex position of the wedge member 71 is lower than a back surface of a loading plate 91a of the cart 90 when the vertex position is lowered to a lowest position by the wedge member lift device 72. The vertex position of the wedge member 71 is higher than the back surface of the loading plate 91a of the cart 90 when the wedge member lift device 72 lifts the vertex position to a highest position.

The back surface of the loading plate 91a of the cart 90 is provided with a hole 94 that the wedge member 71 can enter. An outer shape of the hole 94 is a square. A size of the hole 94 is smaller than that of a lower end of the wedge member 71 of the combining device 70 and larger than that of an upper end thereof. Thus, when the wedge member 71 is inserted from below the hole 94 and enters the hole 94, the wedge member 71 is fitted into the hole 94 at a position where the size of the wedge member 71 and the size of the hole 94 match and the rise of the wedge member 71 is suppressed. The wedge member 71 is combined with the hole 94 at this position. The hole 94 is a concave part provided in the loading part 91 of the cart 90.

Next, the work for combining the unmanned transport vehicle 1 of the present embodiment with the cart 90 will be described. When the unmanned transport vehicle 1 is combined with the cart 90, the operation control device 50 first causes the unmanned transport vehicle 1 to be moved to the vicinity of the cart 90. Subsequently, the operation control device 50 (see FIG. 3) causes the unmanned transport vehicle 1 to be moved so that the wedge member 71 of the combining device 70 is located at a position directly below the hole 94 of the cart 90 based on detected distance information output by a distance sensor 31.

Subsequently, the operation control device 50 causes the wedge member 71 of the combining device 70 to be lifted by controlling the wedge member lift device 72. The operation control device 50 causes the wedge member 71 to be lifted by controlling the wedge member lift device 72 until a position where the lifted wedge member 71 enters the hole 94 and is caught by the hole 94 is reached. The operation control device 50 completes the work for combining the unmanned transport vehicle 1 with the cart 90 by causing the wedge member 71 to be lifted until a position where the wedge member 71 is fitted into the hole 94 is reached.

In the unmanned transport vehicle 1 of the present embodiment, it is possible to avoid the contact with an obstacle or the like and improve the efficiency of the transport movement operation when the cart 90 is moved by the unmanned transport vehicle 1. In the unmanned transport vehicle 1 of the present embodiment, it is possible to combine the unmanned transport vehicle 1 and the cart 90 merely by causing the wedge member 71 of the combining device 70 to be lifted after the wedge member 71 of the combining device 70 is moved to a position directly below the hole 94 of the cart 90. Therefore, it is possible to easily perform the work for combining the unmanned transport vehicle 1 with the cart 90.

Instead of the wedge member 71, a shape of a convex part may be a cone of another shape or may be another shape such as columnar shape. A concave part may be one into which a convex part is fitted. A concave part may be provided in the unmanned transport vehicle 1 and a convex part may be provided in the cart 90. The wedge member 71 may be provided in a plurality of portions and the unmanned transport vehicle 1 and the cart 90 may be combined at a plurality of positions. In this case, a plurality of lift mechanisms 20 for lifting the cart 90 may be provided.

Third Embodiment

Figure 16:
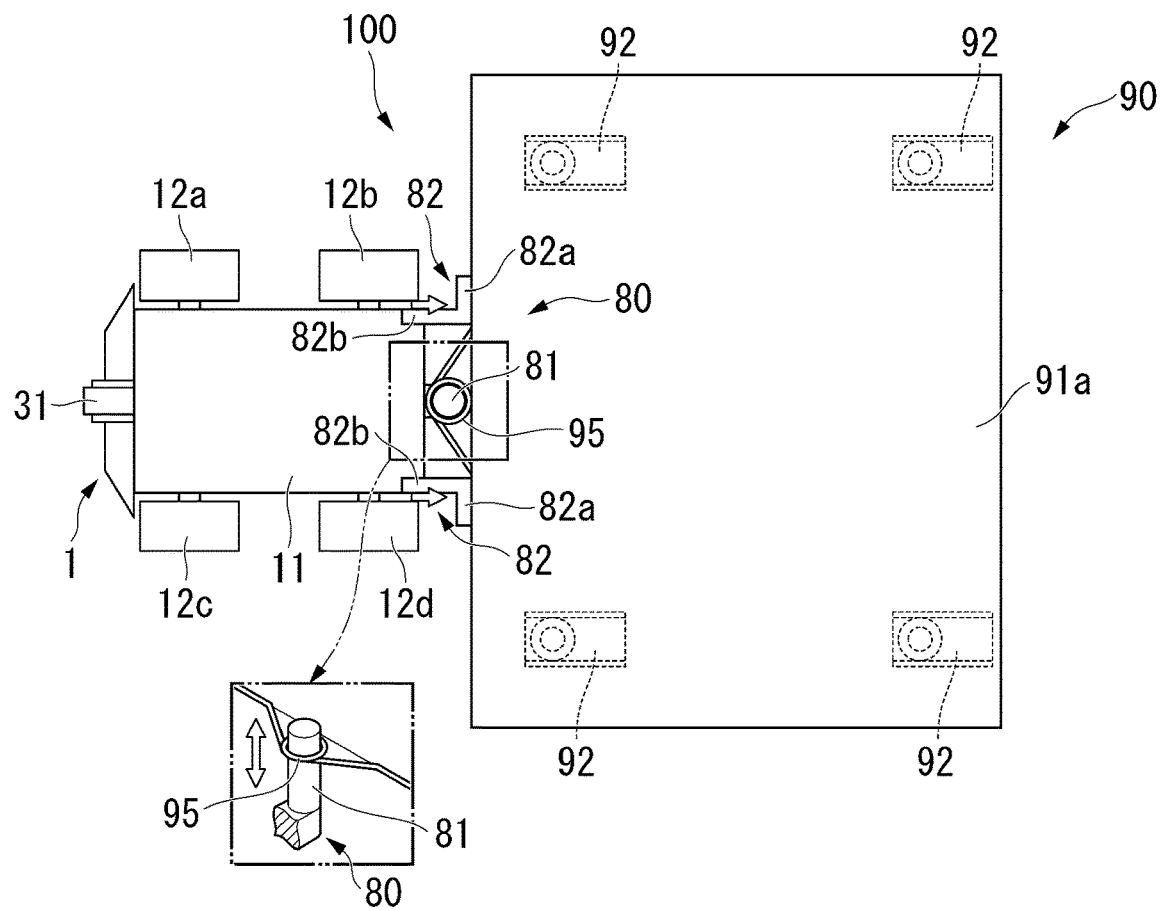
FIG. 16 is a plan view showing an example of an unmanned transport vehicle 1 of a third embodiment and a cart 90.

Next, a third embodiment will be described with reference to FIG. 16. A combining device 80 is provided at an end of an unmanned transport vehicle 1 of the present embodiment. The combining device 80 of the present embodiment is different from the combining device 70 of the second embodiment shown in FIG. 15. As shown in FIG. 16, the combining device 80 in the unmanned transport vehicle 1 of the present embodiment includes a pin 81 and a pressing part 82.

The pin 81 is a cylindrical member. A pin vertical movement mechanism (not shown) is connected to the pin 81 and an operation control device 50 (see FIG. 3) can move the pin 81 upward and downward by operating the pin vertical movement mechanism (an actuator). The pressing part 82 includes an abutting part 82a configured to abut on a side surface of a loading part 91 of a cart 90 and a support part 82b configured to support the abutting part 82a. The abutting part 82a has a flat plate shape and is disposed facing the side surface of the loading part 91 of the cart 90. The support part 82b is disposed on the opposite side via the abutting part 82a when viewed from the cart 90. The support part 82b incorporates a compression spring configured to press the abutting part 82a in the direction of the cart 90. The abutting part 82a is pressed against the cart 90 by a pressing force of the compression spring. The combining device 80 is a posture fixer and fixes a posture relationship between the unmanned transport vehicle 1 and the cart 90 by pressing the abutting part 82a against the cart 90.

A pin hole member 95 is provided on the side surface of the loading part 91 of the cart 90. The pin hole member 95 is provided with a type of pin hole slightly larger than a diameter of the pin 81. The pin 81 can be inserted into the pin hole of the pin hole member 95 by being lifted by the pin vertical movement mechanism. The pin 81 is a connector. As the pin 81 is inserted into the pin hole of the pin hole member 95, the unmanned transport vehicle 1 and the cart 90 are connected. When the compression spring is expanded in the pressing part 82, the abutting part 82a protrudes toward the cart 90 side rather than the pin 81. When the pin 81 is located below the pin hole member 95, the abutting part 82a abuts on the side surface of the loading part 91 of the cart 90 and the compression spring is in a compressed state.

Next, the work for combining the unmanned transport vehicle 1 of the present embodiment with the cart 90 will be described. When the unmanned transport vehicle 1 is combined with the cart 90, the operation control device 50 first causes the unmanned transport vehicle 1 to be moved to the vicinity of the cart 90. Subsequently, the operation control device 50 (see FIG. 3) causes the unmanned transport vehicle 1 to be moved so that the pin 81 of the combining device 80 is located at a position directly below the pin hole of the pin hole member 95 of the cart 90 based on detected distance information output by the distance sensor 31. At this time, the rotation of the caster 92 of the cart 90 is stopped and held or the cart 90 is pressed so that the cart 90 does not move. Thus, when the pressing part 82 of the combining device 80 is pressed against the cart 90, the cart 90 can be prevented from escaping.

When the unmanned transport vehicle 1 is moved, the abutting part 82a of the pressing part 82 abuts on the side surface of the loading part 91 of the cart 90 and the compression spring is compressed. The compression spring generates a pressing force that presses the abutting part 82a in the direction of the loading part 91 by being compressed. The abutting part 82a is pressed against the loading part 91 of the cart 90 by the pressing force of the compression spring.

Subsequently, the operation control device 50 causes the pin 81 to be inserted into the pin hole of the pin hole member 95 by controlling the pin vertical movement mechanism. The pin 81 is positioned with respect to the pin hole member 95 by inserting the pin 81 into the pin hole of the pin hole member 95. Thus, the unmanned transport vehicle 1 is positioned with respect to the cart 90 and the pressing part 82 is pressed against the cart 90 and therefore the work for combining the unmanned transport vehicle 1 with the cart 90 is completed.

In the unmanned transport vehicle 1 of the present embodiment, when the cart 90 is moved by the unmanned transport vehicle 1, the contact with an obstacle or the like can be avoided and the efficiency of the transport movement operation can be improved. In the unmanned transport vehicle 1 of the present embodiment, it is possible to combine the unmanned transport vehicle 1 with the cart 90 merely by lifting the pin 81 of the combining device 80 after the pin 81 of the combining device 80 is moved to a position directly below the pin hole of the pin hole member 95 of the cart 90. Therefore, it is possible to easily perform the work for combing the unmanned transport vehicle 1 with the cart 90.

In the third embodiment, an actuator may be provided in the pressing part 82 so that the pressing part 82 can be moved in a forward/backward direction. In this example, when the pin 81 is inserted into the pin hole of the pin hole member 95, the pressing part 82 is kept away from the cart 90 by the actuator. Then, after the pin 81 is inserted into the pin hole of the pin hole member 95, the pressing part 82 may be pressed against the side surface of the loading part 91 of the cart 90 by the actuator. In this case, the pressing part 82 is driven and pressed out toward the cart side, the abutting part 82a is pressed in contact with the cart and the compression spring within the pressing part is contracted by a reaction force and pressing is further advanced by the compression spring to reach an appropriate load. As a result, it is possible to fix the posture of the abutting parts 82a on both sides in a well-balanced and stretched state between the cart 90 and the unmanned transport vehicle 1. Thus, the unmanned transport vehicle 1 can be stably combined with the cart 90.

When the pressing part 82 is provided with the actuator, independent actuators may be provided in the pressing parts 82 on both sides and the operation timing may be controlled by sequence control. Alternatively, by providing a mechanism in which a vertical position of the pin vertical movement mechanism (the actuator) for inserting the pin 81 is interlocked with a motion in the pressing direction of the pressing part 82, an interlocking operation in which the abutting part 82a protrudes from the pin 81 toward the cart 90 side and is in contact with the cart 90 at a timing when the pin 81 passes through a pin hole of the pin hole member 95 may be implemented and the actuator of the pressing part 82 may be shared with the actuator of the vertical movement mechanism.

Fourth Embodiment

Figure 17:
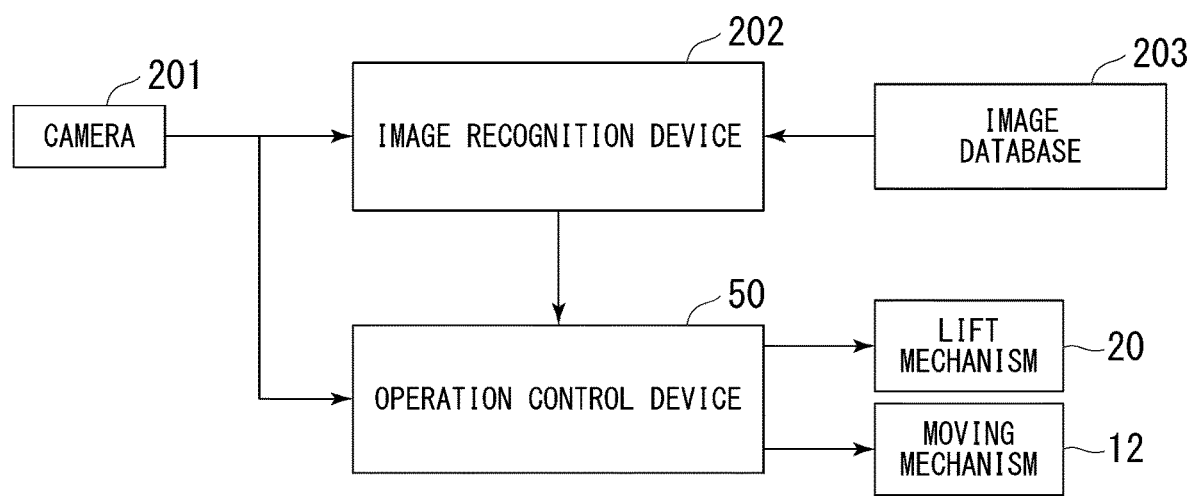
FIG. 17 is a block diagram showing a functional configuration of respective parts in an unmanned transport vehicle 1 of a fourth embodiment.

Next, a fourth embodiment will be described with reference to FIG. 17. As shown in FIG. 17, an unmanned transport vehicle 1 of the present embodiment includes a camera 201 which is an imager in place of the distance sensor 31 of the first embodiment and includes an image recognition device 202 in place of the cart detection device 40. The unmanned transport vehicle 1 includes an image database 203.

The camera 201 captures an image of the surroundings of the unmanned transport vehicle 1. The camera 201 generates image information about the captured image and outputs the image information to the image recognition device 202. The image recognition device 202 recognizes an image based on the image information output by the camera 201 and performs image processing on the recognized image. The image recognition device 202 recognizes a cart 90 around the unmanned transport vehicle 1 from an image processing result. The image recognition device 202 is a recognizer. The image recognition device 202 measures distances from various points of the cart based on the image processing result. The image recognition device 202 measures shape characteristics of the cart based on the measured distances. The image recognition device 202 is a distance measurer and a shape characteristics measurer. The image recognition device 202 may pre-learn a correct image of each type of cart 90 and determine a type of cart 90 at a closet position among carts 90 included in the image captured by the camera 201 during an actual operation.

The image database 203 stores transport characteristics data in which types and transport characteristics of a plurality of types of carts 90 are associated. The image database 203 stores shape characteristics related to the shape of the cart 90 among the transport characteristics. The image database 203 is a shape characteristics database. The image recognition device 202 recognizes shape characteristics obtained by measurement from the image information output by the camera 201. The image recognition device 202 has a search function of searching a plurality of carts stored in the image database 203 for a type of cart having recognized shape characteristics. The image recognition device 202 recognizes the transport characteristics of the type of cart 90 having the measured shape characteristics in the image information output by the camera 201. The image recognition device 202 reads the recognized transport characteristics of the cart 90. The image recognition device 202 outputs transport characteristics information about the read transport characteristics to the operation control device 50.

In the unmanned transport vehicle 1 of the present embodiment, when the cart 90 is moved by the unmanned transport vehicle 1, the contact with an obstacle or the like can be avoided and the efficiency of the transport movement operation can be improved. In the unmanned transport vehicle 1 of the present embodiment, because the cart 90 can be identified based on the information stored in the image database 203, the cart 90 can be easily identified. The image database 203 stores transport parameters such as combination information and pseudo-center position information obtained indirectly from the transport characteristics of the cart 90 so far in addition to the above-described transport characteristics and the image recognition device 202 may be configured to read values of the transport parameters. The combination information is information about a combination of the unmanned transport vehicle 1 and the cart 90 and includes information about an entry position, a direction, a distance, and the like of the cart 90 when the unmanned transport vehicle and the cart 90 are combined in addition to information about a shape and a size of a guide part 93 of the cart 90. The pseudo-center position information includes information about a pseudo-center position after the unmanned transport vehicle 1 is combined with the cart 90.

Although shape characteristics of the cart 90 are measured when the transport characteristics are recognized and a type of cart is identified based on the measured shape characteristics in the present embodiment, the type of cart may be identified in another method. For example, an RF tag according to the type of the cart is attached to each cart 90 and the unmanned transport vehicle 1 is provided with a reader configured to read the RF tag and a tag database configured to store types of carts corresponding to a plurality of types of RF tag information. The unmanned transport vehicle 1 may be configured to search a plurality of types of RF tag information stored in the tag database for the RF tag information read by the reader and recognize a type of transport object using the RF tag information that has been searched for.

Although shape characteristics are measured by performing image processing to identify the type of the cart 90 in the present embodiment, the transport characteristics may be recognized without measuring the shape characteristics. For example, a mark such as a cart number attached to each cart 90 may be acquired by performing image processing and the type of cart 90 may be identified by the mark such as the cart number. The shape of the cart may be measured by, for example, a distance sensor, instead of the image captured by the camera 201.

The image recognition device 202 may be configured to estimate a shape of the cart 90 and a position and a type of caster 92 based on distance information according to distances that are measurement results of distances from the unmanned transport vehicle 1 to various points of the cart 90 measured by image processing. In this case, the image recognition device 202 estimates an outer shape of the cart 90 by a shape estimation algorithm based on the distance information. The image recognition device 202 is a shape estimator configured to estimate the outer shape of the cart 90. The image recognition device 202 estimates the type of caster provided on the cart 90 by a type-of-caster estimation algorithm based on the distance information. The image recognition device 202 is a traveling unit position estimator configured to estimate a traveling unit in the cart 90 based on the distance information.

Furthermore, the unmanned transport vehicle 1 includes a torque sensor (not shown) configured to cause the combination structure 100 to be operated in a specific pattern after the unmanned transport vehicle 1 is combined with the cart 90 and detect and acquire a load applied to the unmanned transport vehicle 1 at that time. The torque sensor is a load acquirer configured to acquire the load applied to the cart 90 when the cart 90 moves. The image recognition device 202 estimates the position of the caster 92 provided on the cart 90 by a caster position estimation algorithm based on load information according to the load applied to the unmanned transport vehicle 1 detected by the torque sensor. The image recognition device 202 is a type-of-traveling unit estimator configured to estimate the type of caster 92 based on the load acquired by the torque sensor.

Fifth Embodiment

Figure 18:
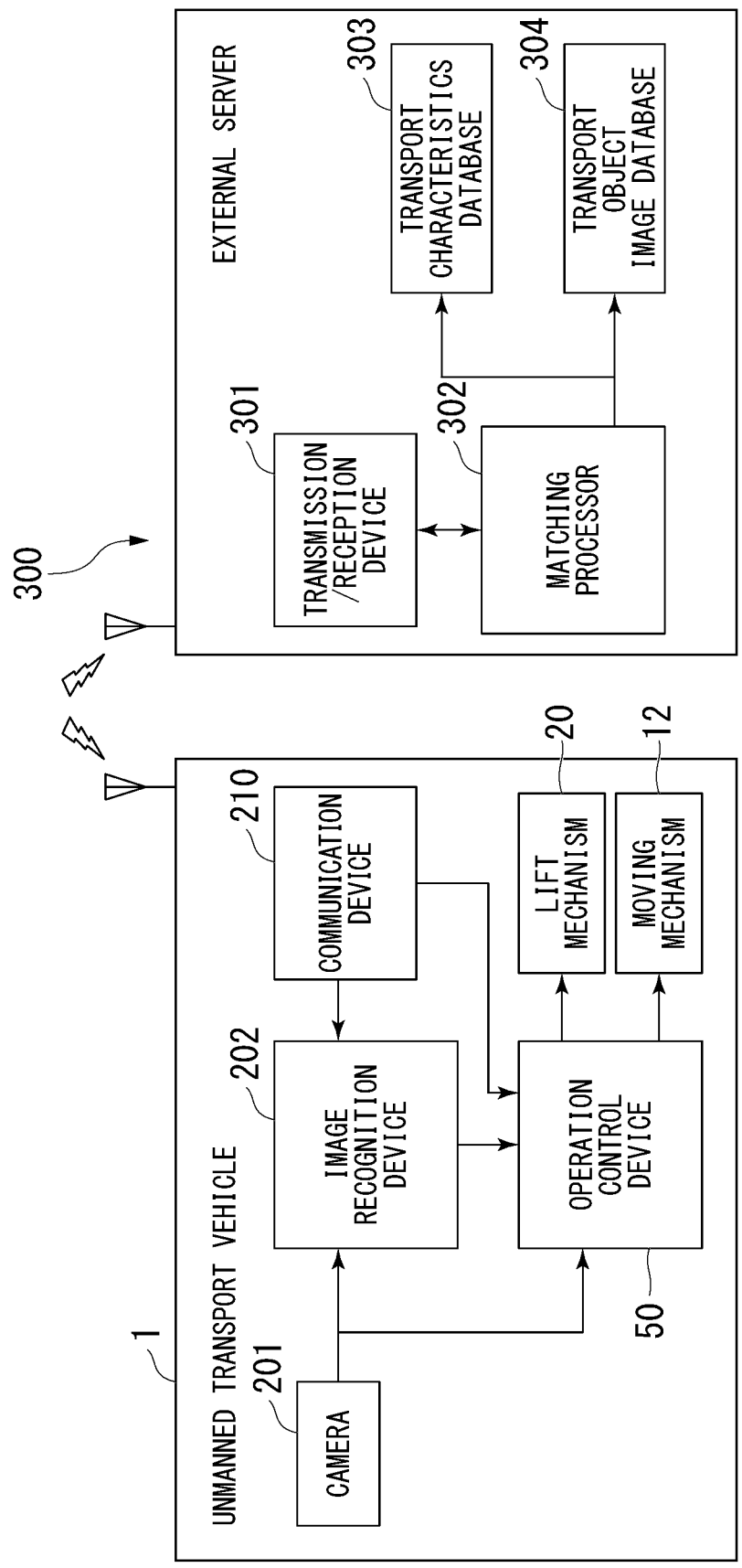
FIG. 18 is a block diagram showing a functional configuration of respective parts in an automatic guided system including an unmanned transport vehicle 1 of a fifth embodiment.

Next, a fifth embodiment will be described with reference to FIG. 18. As shown in FIG. 18, an unmanned transport vehicle 1 includes a communication device 210 configured to communicate with an external server 300. The communication device 210 receives various types of information such as transport characteristics information transmitted by the external server 300 and outputs the information to a cart detection device 40 and an operation control device 50. The unmanned transport vehicle 1 recognizes an image output by the camera 201. Image information about the image recognized by an image recognition device 202 and transport characteristics information about transport characteristics recognized based on the image information are output to the communication device 210. The communication device 210 transmits the image information and the transport characteristics information output by the image recognition device 202 to the external server 300 which is an external device.

The external server 300 includes a transmission/reception device 301, a matching processor 302, a transport characteristics database 303, and a transport characteristics image database 304. The transmission/reception device 301 outputs the image information and the transport characteristics information transmitted by the communication device 210 of the image recognition device 202 to the matching processor 302. The matching processor 302 causes the transport characteristics database 303 to store the transport characteristics information output by the transmission/reception device 301. The matching processor 302 causes the transport characteristics image database 304 to store image information output by the transmission/reception device 301.

The unmanned transport vehicle 1 may recognize the image information by the image recognition device 202 and output the recognized image information to the communication device 210, and the communication device 210 may transmit the output image information to the external server 300. The external server 300 receives the image information transmitted by the communication device 210 in the transmission/reception device 301 and outputs the image information to the matching processor 302. The matching processor 302 matches the image information output by the transmission/reception device 301 against the image information stored in the transport characteristics image database 304 to identify an image transmitted by the unmanned transport vehicle 1. The matching processor 302 identifies a cart 90 serving as the transport object based on the matched image and reads the transport characteristics information of the identified cart 90 from the transport characteristics database 303. The matching processor 302 outputs the read transport characteristics information to the transmission/reception device 301. The transmission/reception device 301 transmits and provides the transport characteristics information output by the matching processor 302 to the communication device 210 of the unmanned transport vehicle 1. The communication device 210 receives and inputs the transport characteristics information transmitted by the transmission/reception device 301, and outputs the transport characteristics information to the image recognition device 202. The communication device 210 is an input configured to input the transport characteristics of the cart 90 provided from the external server 300. Thus, the image recognition device 202 can acquire the transport characteristics information. Thus, the image recognition device 202 can acquire the transport characteristics from the external server 300.

In the unmanned transport vehicle 1 of the present embodiment, it is possible to avoid the contact with an obstacle or the like and improve the efficiency of the transport movement operation when the cart 90 is moved by the unmanned transport vehicle 1. The unmanned transport vehicle 1 of the present embodiment can acquire the transport characteristics of the cart 90 from the external server 300 which is an external device. Therefore, a storage burden imposed on the unmanned transport vehicle 1 can be reduced.

Sixth Embodiment

Figure 19:
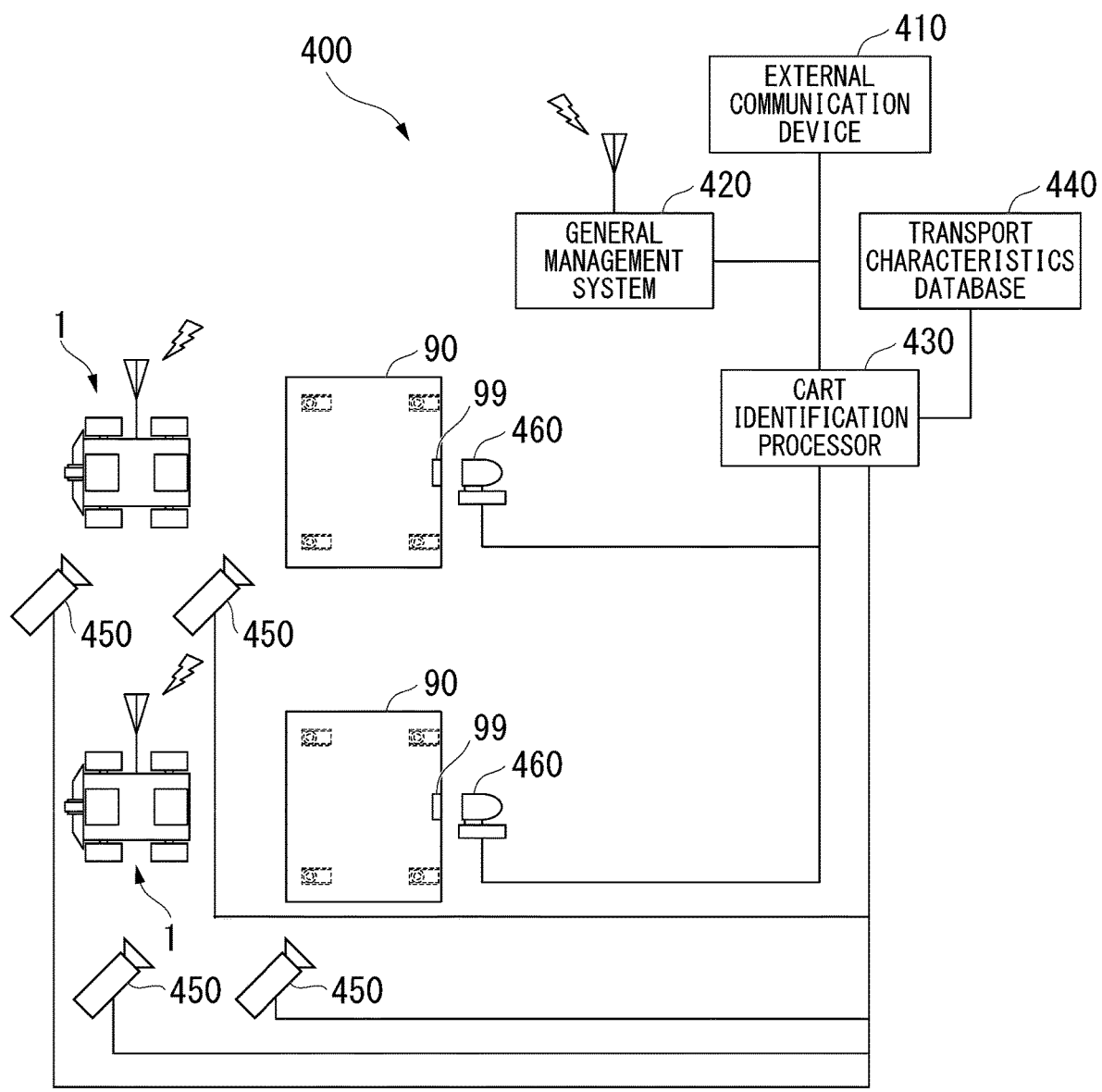
FIG. 19 is a diagram showing an outline of a warehouse in which an unmanned transport vehicle 1 of a sixth embodiment is used.

Next, a sixth embodiment will be described with reference to FIG. 19. As shown in FIG. 19, a plurality of unmanned transport vehicles 1 and carts 90 are accommodated in a work site 400. The unmanned transport vehicle 1 has a configuration similar to that of the first embodiment and includes a communication device (not shown). In the work site 400, an external communication device 410, a general management system 420, a cart identification processor 430, and a transport characteristics database 440 are installed. The communication device 210 can communicate with the external communication device 410.

In the work site 400, a plurality of indoor cameras 450 and a tag reader 460 are installed. The indoor camera 450 images a situation within the work site 400 and transmits a captured image to the cart identification processor 430 as imaging information. An RF tag 99 indicating the type of cart 90 is attached to the cart 90. The tag reader 460 reads the RF tag 99 attached to the cart 90, identifies the type of cart 90 facing the tag reader 460, and transmits the identified type of cart 90 as type-of-cart information to the cart identification processor 430.

The general management system 420 generally controls the external communication device 410, the cart identification processor 430, and the transport characteristics database 440 installed in the work site 400. The general management system 420 is a management device configured to manage a plurality of carts 90. The cart identification processor 430 identifies the cart 90 serving as a transport object of the unmanned transport vehicle 1 based on the image information transmitted by the communication device 210 of the unmanned transport vehicle 1. The cart identification processor 430 identifies the type of cart 90 identified as the transport object of the unmanned transport vehicle 1 based on cart type information. The cart identification processor 430 reads the transport characteristics of the cart 90 from the transport characteristics database 440 based on the type of cart 90 identified as the transport object of the unmanned transport vehicle 1. The cart identification processor 430 transmits the read transport characteristics to the unmanned transport vehicle 1 identifying the transport object.

In the unmanned transport vehicle 1 of the present embodiment, when the cart 90 is moved by the unmanned transport vehicle 1, the contact with an obstacle or the like can be avoided and the efficiency of the transport movement operation can be improved. The unmanned transport vehicle 1 of the present embodiment can acquire the transport characteristics of the cart 90 output by the cart identification processor 430 via the external communication device 410. Therefore, the storage load imposed on the unmanned transport vehicle 1 can be reduced. The indoor camera 450 and the tag reader 460 identify the cart 90 serving as the transport object of the unmanned transport vehicle 1 and transmit the transport characteristics of the identified cart 90 to the unmanned transport vehicle 1. Thus, because the unmanned transport vehicle 1 also does not need to identify the transport object, the processing load imposed on the unmanned transport vehicle 1 can be reduced.

Although some embodiments and modified examples have been described above, the embodiments are not limited to the above-described examples. For example, the type of cart 90 serving as the transport object may be identified and the transport characteristics of the cart may be known. In this case, the type of cart 90, transport information, and transport parameters may be input in advance and may be set in the operation control device 50 of the unmanned transport vehicle 1 using a text file or a GUI.

The transport object is not limited to the cart 90 and may be another one. For example, the transport object may be a hand cart or a smart carry. Things other than a cart may be used. When transport characteristics and the like are externally transmitted (input), information may be input from a device other than the external server 300. For example, the input may be performed by an operator operating an input device such as a touch panel or a keyboard. The transport characteristics and the like may be input before the unmanned transport vehicle 1 is combined with the cart 90 to generate the combination structure 100.

According to at least one embodiment described above, because the operation of the combination structure 100 moving along a movement path is determined based on a pseudo-reference position different from the operation reference position of the unmanned transport vehicle 1 and an operation command related to a vehicle body operation for implementing the determined operation of the combination structure 100 is generated, the efficiency of the transport movement operation can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An unmanned transport vehicle comprising:
a vehicle body combinable with a transport object;
a moving mechanism configured to cause the vehicle body to be moved; and
an operation control device configured to control an operation of the moving mechanism,
wherein the operation control device comprises:
a pseudo-reference position setter configured to set a pseudo-reference position serving as an operation reference position of a combination structure of the vehicle body and the transport object to be different from a vehicle body reference position that is an operation reference position of the vehicle body;
a path acquirer configured to acquire a movement path from a current position of the combination structure to a target position;
an operation command generator configured to determine an operation of the combination structure that is configured to move along the movement path acquired by the path acquirer based on the pseudo-reference position and generate an operation command related to a vehicle body operation that implements the determined operation of the combination structure; and
a driving controller configured to cause the moving mechanism to be driven based on the operation command, and
wherein the operation command generator is configured to:
obtain a combination structure operation related to the operation of the combination structure that is configured to move along the movement path acquired by the path acquirer; and
convert the combination structure operation into the vehicle body operation to generate the operation command by performing inverse conversion according to an inverse conversion equation relative to a conversion equation when the vehicle body reference position is converted into the pseudo-reference position.

2. The unmanned transport vehicle according to claim 1, wherein
the operation command generator is configured to acquire the operation of the combination structure based on transport characteristics of the combination structure.

3. The unmanned transport vehicle according to claim 1, wherein
the transport object comprises a traveling unit, and
the operation control device is configured to adjust a driving force for causing the moving mechanism to be driven based on a type of the traveling unit.

4. The unmanned transport vehicle according to claim 3, wherein
the traveling unit comprises a plurality of casters, and the operation control device is configured to detect a driving torque when the caster rotates and identify a type of caster based on the detected driving torque.

5. The unmanned transport vehicle according to claim 4, wherein
traveling directions of the plurality of casters are convertible, and
the pseudo-reference position setter is configured to set a central position of a circumscribed circle having a minimum radius with respect to the combination structure as the pseudo-reference position.

6. The unmanned transport vehicle according to claim 4, wherein
some of the plurality of casters are a plurality of fixed casters having a fixed traveling direction, and
a central point of the plurality of fixed casters is set as the pseudo-reference position.

7. The unmanned transport vehicle according to claim 1, further comprising:
a combiner configured to couple the vehicle body with the transport object and fix a relative positional relationship between the vehicle body and the transport object.

8. The unmanned transport vehicle according to claim 7, wherein
the combiner comprises:
a lift plate provided on the vehicle body and configured to lift the transport object; and
a lift mechanism configured to cause the lift plate to be lifted and lowered, and
the lift plate is provided on a bottom of the transport object, inserted into a guide part of a concave shape, and configured to have a relative positional relationship fixed with respect to the transport object.

9. The unmanned transport vehicle according to claim 7, wherein
the combiner comprises a concave part or a convex part fittable to the transport object.

10. The unmanned transport vehicle according to claim 7, wherein
the combiner comprises:
a connector configured to connect the vehicle body and the transport object; and
a posture fixer configured to fix a posture relationship between the vehicle body and the transport object.

11. The unmanned transport vehicle according to claim 1, further comprising:
a recognizer configured to recognize transport characteristics of the transport object.

12. The unmanned transport vehicle according to claim 11, wherein
the transport characteristics include combination information about a combination with the vehicle body.

13. The unmanned transport vehicle according to claim 11, wherein
the transport characteristics include dimension information about dimensions of the transport object.

14. The unmanned transport vehicle according to claim 11, wherein
the transport characteristics include pseudo-reference position information about the pseudo-reference position.

15. The unmanned transport vehicle according to claim 11, wherein
the transport characteristics include traveling unit information about a traveling unit provided in the transport object.

16. The unmanned transport vehicle according to claim 11, further comprising:
an imager configured to image the transport object; and
an image database storing image information related to an image of the transport object,
wherein the recognizer is configured to match the image information related to the image obtained by the imager imaging the transport object against the image information stored in the image database to recognize the transport characteristics.

17. The unmanned transport vehicle according to claim 11, further comprising:
a reader attachable to the transport object and configured to read RF tag information from an RF tag associated with a type of the transport object; and
a tag database storing a plurality of types of RF tag information and types of carts associated with the RF tag information,
wherein the recognizer is configured to search the plurality of types of RF tag information stored in the tag database for the RF tag information read by the reader and recognize the type of the transport object using the RF tag information that has been searched for.

18. The unmanned transport vehicle according to claim 11, further comprising:
a shape characteristics measurer configured to measure shape characteristics of the transport object; and
a shape characteristics database storing a plurality of types of shape characteristics and transport characteristics associated with the shape characteristics,
wherein the recognizer is configured to search the shape characteristics database for the transport characteristics of the transport object having the shape characteristics measured by the shape characteristics measurer and recognize the type of the transport object using the shape characteristics that have been searched for.

19. The unmanned transport vehicle according to claim 11, further comprising:
a shape estimator configured to estimate an external shape of the transport object based on a measurement result of a distance measurer;
a traveling unit position estimator configured to estimate a traveling unit in the transport object based on the measurement result of the distance measurer;
a load acquirer configured to acquire a load imposed on the transport object when the transport object moves; and
a type-of-traveling unit estimator configured to estimate a type of traveling unit based on the load acquired by the load acquirer.

20. The unmanned transport vehicle according to claim 11, further comprising:
an input configured to input transport characteristics provided from an external device,
wherein the recognizer is configured to recognize the transport characteristics of the transport object based on the transport characteristics input by the input.

21. The unmanned transport vehicle according to claim 20, wherein
the input is configured to input transport characteristics provided from a management device configured to manage a plurality of transport objects.

22. The unmanned transport vehicle according to claim 20, wherein
the input is configured to input transport characteristics provided from the transport object.

23. The unmanned transport vehicle according to claim 20, wherein
the external device is an input device configured to perform an input by an operation of an operator, and
the input is configured to input transport characteristics provided from the input device.

24. A method of controlling an unmanned transport vehicle, the method comprising:
setting a pseudo-reference position serving as an operation reference position of a combination structure of a vehicle body combinable with a transport object and the transport object to be different from a vehicle body reference position that is an operation reference position of the vehicle body in a case in which the vehicle body is not combined with the transport object;
acquiring a movement path from a current position of the combination structure to a target position serving as a transport destination;
determining an operation of the combination structure that moves along the movement path from the current position of the combination structure to the target position serving as a transport destination based on the pseudo-reference position and generating an operation command related to a vehicle body operation that implements the determined operation of the combination structure; and
causing a moving mechanism, which causes the vehicle body to be moved, to be driven based on the operation command,
wherein the method further comprises:
obtaining a combination structure operation related to the operation of the combination structure that is configured to move along the acquired movement path; and
converting the combination structure operation into the vehicle body operation to generate the operation command by performing inverse conversion according to an inverse conversion equation relative to a conversion equation when the vehicle body reference position is converted into the pseudo-reference position.

25. A non-transitory computer-readable storage medium storing a program causing a computer to perform:
setting a pseudo-reference position serving as an operation reference position of a combination structure of a vehicle body combinable with a transport object and the transport object to be different from a vehicle body reference position that is an operation reference position of the vehicle body in a case in which the vehicle body is not combined with the transport object;
acquiring a movement path from a current position of the combination structure to a target position serving as a transport destination;
determining an operation of the combination structure that moves along the movement path from the current position of the combination structure to the target position serving as a transport destination based on the pseudo-reference position and generating an operation command related to a vehicle body operation that implements the determined operation of the combination structure; and
causing a moving mechanism, which causes the vehicle body to be moved, to be driven based on the operation command,
wherein the program further causes the computer to perform:
obtaining a combination structure operation related to the operation of the combination structure that is configured to move along the acquired movement path; and
converting the combination structure operation into the vehicle body operation to generate the operation command by performing inverse conversion according to an inverse conversion equation relative to a conversion equation when the vehicle body reference position is converted into the pseudo-reference position.

* * * * *